(12) United States Patent
Kashima

(10) Patent No.: US 7,720,336 B2
(45) Date of Patent: May 18, 2010

(54) CODE DIVISION MULTIPLEXING OPTICAL ACCESS NETWORK SYSTEM

(75) Inventor: Masayuki Kashima, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 415 days.

(21) Appl. No.: 11/902,128

(22) Filed: Sep. 19, 2007

(65) Prior Publication Data

US 2008/0075462 A1    Mar. 27, 2008

(30) Foreign Application Priority Data

Sep. 22, 2006    (JP) ............................. 2006-257578

(51) Int. Cl.
    *G02B 6/26*    (2006.01)
(52) U.S. Cl. ............................... 385/46; 385/15; 385/39
(58) Field of Classification Search ................... 385/15, 385/39, 46
    See application file for complete search history.

(56) References Cited

U.S. PATENT DOCUMENTS 7,076,563 B1 *  7/2006  Yamanaka et al. .......... 709/233
7,403,477 B2 *  7/2008  Takeuchi et al. ............. 370/230

FOREIGN PATENT DOCUMENTS

JP    10-107755    4/1998
JP    10-242981    9/1998

* cited by examiner

*Primary Examiner*—Jennifer Doan
(74) *Attorney, Agent, or Firm*—Rabin & Berdo, P.C.

(57) ABSTRACT

The present invention provides an optical access network system that allows the transmission of packets irrespective of the packet length and which is also capable of adapting to cases where another user temporarily requires a large capacity bandwidth. This system performs two-way optical communications using a code division multiplexing system via an optical fiber channel and a star coupler between an optical line terminal and first and second optical network units. The optical line terminal comprises a bandwidth control section and a bandwidth allocation section and the bandwidth control section has signal converter pairs installed therein in a number equal to the number of optical network units. Further, the optical network units each comprise first and second bandwidth control sections and first and second bandwidth allocation sections. The bandwidth control sections each have one set of signal converter pairs installed therein. The bandwidth control sections of the optical line terminal and the optical network units each have a signal converter pair that is constituted by one set of a variable serial to parallel conversion unit and a variable parallel to serial conversion unit each having a variable bandwidth management function.

10 Claims, 11 Drawing Sheets

CODE DIVISION MULTIPLEXING OPTICAL ACCESS NETWORK SYSTEM

BACKGROUND OF THE INVENTION

1. Field of the Invention

The present invention relates to an optical access network system whereby a provider and a subscriber communicate by means of a code division multiplexing (CDM) system in a passive optical network (PON).

2. Description of Related Art

Optical access network systems that are constituted by connecting a provider (also called a 'center' hereinafter) and a plurality of subscribers (also called 'users' hereinafter) via a PON have attracted attention. In the following description, a provider-side device is also referred to as the optical line terminal (OLT) and a subscriber-side device is also known as the optical network unit (ONU).

A PON is a network in which a single optical fiber channel is split into a plurality of optical fiber channels by connecting a star coupler which is a passive element midway along the optical fiber channel and a plurality of optical terminal devices are connected in a star shape with the star coupler at the center thereof. By adopting a PON for a network that joins a center and its users, an optical fiber channel between the center and the star coupler can be shared by a plurality of users, whereby equipment costs can be suppressed.

For efficient usage of communication resources in a PON system, a best effort service is the norm. However, in order to simultaneously execute speech (call) services, video services, data communication services and so forth as the application services which are provided in the PON system, it is necessary to secure a bandwidth with minimal restrictions for speech and video communications and so forth. Furthermore, in a PON network that is constructed in an enterprise, it is necessary to update a database and temporarily large-capacity communications are required. Thus, in order to always guarantee efficient communications in correspondence with the status in which the PON network is used, rational bandwidth control and management of the bandwidth used are sometimes required.

Therefore, a time slot allocation control device that permits efficient bandwidth control as a result of the optical line terminal allocating time slots to the respective optical network units in accordance with the standby information amount during the operation of each of the optical network units or the increase in the standby information amount has been disclosed (See Japanese Application Laid Open No. H10-107755, for example). With the time slot allocation control device, the optical line terminal first issues a request to all the optical network units to send individual management slots in one or more time slots while the respective optical network units report the standby information amount of the optical network units to the optical line terminal at the point where the transmission of the individual management slots is requested by the optical line terminal.

The optical line terminal allocates the time slot for the next frame based on the standby information amount reported by the respective optical network units. The capacity allocated to each of the optical network units is determined as being proportional to the standby information amount, for example. Alternatively, the capacity allocated to each of the optical network units is determined using a method such as that of performing correction to allocate the lowest capacity, allocating the excess in the allocated value, and uniform distribution by the terminals to which a capacity equal to or more than the lowest capacity has been allocated.

The above device affords simple control and also billing processing in accordance with the capacity allocated to each of the optical network units.

In addition, a dynamic time slot allocation system that performs time slot allocation efficiently in accordance with changes in the transmission amount has been disclosed (See Japanese Patent publication No. 3490583, for example). This dynamic time slot allocation system is a system in which a plurality of optical network units and one optical line terminal are connected by a PON. A poling system is adopted for this system. The poling system is a system in which the optical line terminal does not make sequential transmission requests to the optical network units or it is hard for the optical line terminal to make such transmission requests. The optical line terminal is able to transmit data to the respective optical network units at any time but the respective optical network units are able to transmit data to the optical line terminal only given confirmation of a request to do so.

That is, in a dynamic time slot allocation system, the optical network units comprise means for issuing a poling request to the optical line terminal and the optical line terminal comprises means for identifying the poling requests sent by the optical network units and allocating a time slot in accordance with the poling standby information amount to a spare domain of lowest guarantee poling. As a result, the whole system, in which a plurality of optical network units and one optical line terminal device are connected via a PON, is constituted to allow the allocation of time slots to be performed efficiently and dynamically.

As mentioned earlier, this dynamic time slot allocation system is a system that is capable of guaranteeing each optical network unit the lowest bandwidth and of controlling the bandwidth dynamically by opening the required bandwidth for the respective optical network units on the basis of information on the spare bandwidth and so forth. That is, this system can be said to be a system that is devised in order to be able to efficiently utilize the communication resources.

In order to be able to adapt to packets of a variety of packet lengths, the time slot allocation control device must perform control to separate or combine packets. Further, a division signal for the separation of packets must be subjected to delay control. However, it is difficult for the time slot allocation control device to be able to execute control in order to perform this separation or synthesis and to execute division signal delay control.

Furthermore, with respect to the method executed by the dynamic time slot allocation system, a situation where it is not possible to adapt to a case where another user temporarily requires a large capacity bandwidth in the circumstance that a specified user always uses a large capacity bandwidth arises.

SUMMARY OF THE INVENTION

Therefore, an object of the present invention is to provide a code division multiplexing optical access network system that is capable of dealing with packet signals of a variety of lengths and for which bandwidth control and used bandwidth management that are capable of adapting to a case where another user temporarily requires a large capacity bandwidth are adopted.

The present invention is an optical access network system that performs two-way optical communications using a code division multiplexing system between an optical line terminal which is a device installed on the provider side and an optical network terminal which is a device that is provided on the user side. The optical line terminal and the plurality of optical network units are joined via an optical fiber channel, a star coupler and a plurality of branched optical fiber channels. The star coupler is provided at one end of the optical fiber channel and the optical line terminal is joined to the other end of the optical fiber channel. Further, the optical fiber channel is divided into a plurality of branched optical fiber channels by the star coupler and one optical network unit is joined to each of the branched optical fiber channels.

In order to achieve the above object, a code division multiplexing optical access network system with the following constitution is provided according to the point of present invention.

The optical line terminal and the plurality of optical network units which are the basic constituent elements of the code division multiplexing optical access network system of the present invention each possess the following characteristics.

The optical line terminal comprises a bandwidth control section and a bandwidth allocation section and the bandwidth control section comprises signal converter pairs in a number equal to the number of optical network units. Further, the optical network units comprise a bandwidth control section and a bandwidth allocation section and the bandwidth control section comprises a set of signal converter pairs.

The respective signal converter pairs of the optical line terminal and the optical network units are installed as one set of a variable serial to parallel conversion unit and a variable parallel to serial conversion unit which each have a variable bandwidth management function.

The bandwidth allocation section comprises a plurality of encoders (sometimes also called an encoder group hereinbelow) that encode parallel signals output by the variable serial to parallel conversion unit and a plurality of decoders (sometimes also called a decoder group hereinbelow) that decode parallel signals that are input to the variable parallel to serial conversion unit. Further, the bandwidth allocation section comprises a parallel signal multiplexer that multiplexes parallel signals that are output by the encoder group and a serial signal distributor that divides the serial signal in order to generate parallel signals that are input to the decoder group.

When the code division multiplexing optical access network system of the present invention is constituted, the optical line terminal suitably comprises PHY/MAC (Physical layer/Media Access Control layer) interfaces in a number equal to the number of optical network units and an O/E converter. Further, each of the optical network units suitably comprises a PHY/MAC interface and an O/E converter.

The PHY/MAC interface that the optical line terminal comprises has a function for performing 4B5B conversion on a serial signal that is input by a metropolitan area network, which is an external network to which the code division multiplexing optical access network system of the present invention is connected, to a layer-3 switch and on a serial signal that is output by the layer-3 switch. That is, the layer-3 switch has a function to send the 4B5B-converted serial signal that is output by the optical line terminal to the external metropolitan area network and to input a serial signal, which has been sent from the external metropolitan area network or the like to the code division multiplexing optical access network system of the present invention, to the optical line terminal.

The layer-3 switch has a routing function for the third layer of the OSI (Open System Interconnection) reference model and a transfer function for the second layer of the OSI reference model (media access control function). The PHY/MAC interface has a function for the interface between the second layer which is the media access control layer of the OSI reference model and the first layer which is the physical layer of the OSI reference model.

The O/E converter that the optical line terminal and optical network units each comprise convert a signal that is input to the bandwidth allocation section that the optical line terminal and optical network units each comprise into an electrical signal and converts a signal that is output by the bandwidth allocation section into an optical signal. Here, 'O/E conversion' indicates either the conversion of an optical signal into an electrical signal or the conversion of an electrical signal into an optical signal. Hence, the O/E converter that the optical line terminal and optical network units each comprise comprises a photodiode for converting an optical signal into an electrical signal and a light-emitting diode for converting an electrical signal into an optical signal. Further, the constitution is such that an optical signal that is input to the O/E converter is input to the photodiode and an electrical signal that is input to the O/E converter is input to the light-emitting diode. The light-emitting diode may be a laser diode.

Preferably speaking, the variable serial to parallel conversion unit may comprise a demultiplexer, a first buffer circuit, a first buffer circuit group, and a variable serial to parallel conversion unit control section. The demultiplexer converts a serial signal into parallel signals. The first buffer circuit temporarily stores the serial signal and inputs same to the demultiplexer. The first buffer circuit group temporarily stores the parallel signals output by the demultiplexer and inputs same to the bandwidth allocation section. The variable serial to parallel conversion unit control section may comprise a demultiplexer control signal generator, a high-speed variable clock signal generator, and a delayed clock signal generator. The variable serial to parallel conversion unit control section supplies a control signal to the demultiplexer, a first buffer circuit, and a first buffer circuit group.

Further, the variable parallel to serial conversion unit may comprise a multiplexer, a second buffer circuit group, a second buffer circuit, and a variable parallel to serial conversion unit control section. The multiplexer converts parallel signals into a serial signal. The second buffer circuit group temporarily stores parallel signals output by the decoder group that the bandwidth allocation section comprises and inputs the parallel signals to the multiplexer. The second buffer circuit temporarily stores and outputs the serial signal output by the multiplexer. The variable parallel to serial conversion unit control section may comprise a multiplexer control signal generator, a high-speed variable clock signal generator and a delayed clock signal generator. The variable parallel to serial conversion unit control section supplies a control signal to the multiplexer, the second buffer circuit and the second buffer circuit group.

According to the code division multiplexing optical access network system of the present invention, the optical line terminal and optical network units each comprise a bandwidth control section and a bandwidth allocation section. Further, the bandwidth control section is provided with a signal converter pair that comprises a set of a variable serial to parallel conversion unit and a variable parallel to serial conversion unit.

A serial signal such as a packet signal or the like that is input to the optical line terminal from an external network to which the code division multiplexing optical access network system of the present invention is connected such as a metropolitan area network is converted into parallel signals by means of the variable serial to parallel conversion unit that the bandwidth control section comprises. That is, one input signal such as a serial signal is converted by the variable serial to parallel conversion unit into a plurality (n, where n is an integer of one or more) of output signal groups called parallel signals.

In the following description, suppose that the number n of output signals that constitute the output signal groups that are output by the variable serial to parallel conversion unit is the number of parallel signals. Further, the parallel signals that are output by the demultiplexer or the like are a set of a plurality of output signals which are arranged in a row and, therefore, although the term output signal group is correct, as long as there is no confusion, the signals are also simply called output signals. For example, instead of stating that 'each of the plurality of output signals that constitute the parallel signals output by the variable serial to parallel conversion unit is input to the bandwidth allocation section', this is sometimes also abbreviated as 'the output signals output by the variable serial to parallel conversion unit are input to the bandwidth allocation section'. Likewise, although the term 'input signal group' is also correct for the parallel signals that are input to the multiplexer or the like, this is also sometimes abbreviated simply as 'input signals'.

The output signals that are output by the variable serial to parallel conversion unit are input to the bandwidth allocation section. The bandwidth allocation section comprises an encoder group that comprises a plurality of encoders that encode parallel signals output by the variable serial to parallel conversion unit and the plurality of output signals that constitute the parallel signals are input one-for-one to the encoders that constitute the encoder group where these signals are encoded. In the case of parallel signals for which the number of parallel signals is n, the n output signals are each input in parallel one-for-one to the n encoders that constitute the encoder group that the bandwidth allocation section comprises where these signals are encoded.

In cases where the length on the time axis of the serial signal (packet signal, for example) that is input to the variable serial to parallel conversion unit that the bandwidth control section comprises is long, a large number of parallel signals is set and, in cases where the packet signal is short, a small number of parallel signals is set.

In other words, by setting the number of parallel signals of the variable serial to parallel conversion unit in accordance with the length of the packet signal that is input to the optical line terminal, packet signals of various lengths can be converted into parallel signals. Stated differently, the variable serial to parallel conversion unit that the optical line terminal comprises has a variable bandwidth management function. Hence, the optical access network system of the present invention is capable of dealing with packet signals of a variety of lengths. The used bandwidth management can be executed by using the variable bandwidth management function.

The bandwidth control section of the optical line terminal has signal converter pairs installed therein in a number equal to the number of optical network units and the bandwidth control section of the optical network units has one set of signal converter pairs installed. Further, the respective bandwidth allocation sections of the optical line terminal and optical network units comprise an encoder group that encodes parallel signals that are output by the variable serial to parallel conversion unit and a decoder group that decodes the parallel signals that are input to the variable parallel to serial conversion unit.

The parallel signals output by the encoder group are multiplexed by the parallel signal multiplexer and the serial signal output by the decoder group is divided by the serial signal distributor. A signal that is transmitted by the optical line terminal to the optical network units or a signal that is transmitted by the optical network units to the optical line terminal is a code division multiplexed signal obtained by multiplexing signals produced as a result of the parallel signals being encoded by the encoders.

In other words, a signal that is transmitted by the optical line terminal to the optical network units is a code division multiplexed signal that has been encoded by the encoder group that the bandwidth allocation section of the optical line terminal comprises and then converted into a serial signal as a result of multiplexing. In other words, signals that are transmitted by the optical line terminal to the optical network units are encoded parallel signals at the stage where the signals have been encoded and output by the encoder group that the bandwidth allocation section of the optical line terminal comprises but become a code division multiplexed signal obtained through conversion to a serial signal as a result of the parallel signals being multiplexed by the parallel signal multiplexer.

The code division multiplexed signal is received by the optical network units and is converted into parallel signals as a result of being input to and divided by the serial signal distributor that the bandwidth allocation section of the optical network units comprises. The parallel signals directly after being output by the serial signal distributor are parallel signals in an encoded state. These parallel signals in an encoded state are decoded by the decoders that the bandwidth allocation section comprises. The decoded parallel signals are then converted into a serial signal after being input to the variable parallel to serial conversion unit that the bandwidth control section of the optical network units comprises.

As per the signal transmitted by the optical line terminal to the optical network units, the signals that are transmitted by the optical network units to the optical line terminal are a code division multiplexed signal that has been encoded by the encoders that the bandwidth allocation section of the optical network units comprises and then converted into a serial signal by performing multiplexing. The code division multiplexed signal is received by the optical line terminal, converted into parallel signals as a result of being input to the serial signal distributor that the bandwidth allocation section of the optical line terminal comprises and divided, and then decoded by the decoders that the bandwidth allocation section comprises. The decoded parallel signals are converted into a serial signal as a result of being input to the variable parallel to serial conversion unit that the bandwidth control section of the optical line terminal comprises.

Suppose that, when a user to which a certain specified optical network unit has been allocated temporarily requires a large capacity bandwidth, the number of parallel signals is made large for the signal converter pairs of the optical line terminal which correspond with the optical network units and the signal converter pairs that the optical network units comprise. Thus, even when the user temporarily requires a large capacity bandwidth, it is possible to deal with the transmission and reception between the optical line terminal and this user-allocated optical network unit. In other words, bandwidth control and used bandwidth management are implemented.

The following functions are implemented as a result of the optical line terminal being connected via the layer-3 switch to an external network of the code division multiplexing optical access network system of the present invention (metropolitan area network), for example. As a result of the layer-3 switch, the connection of the code division multiplexing optical access network system of the present invention with the metropolitan area network or the like is easily implemented. As a result of the routing function of the layer-3 switch, mutual communication using packets is possible between a plurality of subnets having different network addresses (the same type of system as the code division multiplexing optical access network system of the present invention).

The optical line terminal and optical network units each have a PHY/MAC interface with a 4B5B conversion function. Hence, a binary digital serial signal that is input to or output by the code division multiplexing optical access network system of the present invention is converted into a digital signal in which the same value does not occur in succession even in the event of a digital signal in which the same value (1 or 0) occurs in succession. Hence, for example, characteristic problems such as the problem that extraction of a synchronization signal is difficult which arises as a result of a part in which the same value occurs in succession being contained in the binary digital serial signal that constitutes the packet signal can be avoided.

Because the PHY/MAC interface fulfils the function of an interface between the second layer which is the media access control layer of the OSI reference model and the first layer which is the physical layer of the OSI reference model, a connection between the layer-3 switch and the variable serial to parallel conversion unit and a connection between the layer-3 switch and the variable parallel to serial conversion unit are possible.

Furthermore, because the optical line terminal and optical network units each comprise an O/E converter, an electrical code division multiplexed signal that is output by the bandwidth allocation section is converted into an optical code division multiplexed signal and an optical code division multiplexed signal is converted into an electrical code division multiplexed signal and input to the bandwidth allocation section. As a result of the O/C conversion function, the optical line terminal and optical network units can be connected by means of a PON.

The following functions are implemented as a result of the variable serial to parallel conversion unit comprising a demultiplexer, a first buffer circuit, a first buffer circuit group, and a variable serial to parallel conversion unit. The serial signal that is output by the PHY/MAC interface is first input to the first buffer circuit and temporarily stored therein. This serial signal is then output by the first buffer circuit in accordance with a high-speed variable clock signal that is output by the first high-speed variable clock signal generator and input to the demultiplexer. The serial signal is then converted into parallel signals. The parallel signals output by the demultiplexer are input to the first buffer circuit group and temporarily stored therein.

The details will be provided subsequently. However, as a result of the method of setting the read signal that is supplied by the variable serial to parallel conversion unit control section that is input to the first buffer circuit, it is possible to set how many parallel signals the serial signal that is output by the PHY/MAC interface is to be converted into. For example, when the read signal is set so that this serial signal is converted into three parallel signals, for example, the read signal may be set such that three clock pulses of the interface rate (corresponds to the frequency of a high-speed clock signal) which is the serial signal communication speed are generated within one cycle of the PON rate which is the parallel signal communication speed (corresponds to the frequency of a low-speed clock signal) in succession from the header position of one cycle of the PON rate. Hence, because the serial signal can be converted into parallel signals in a number equal to this number of clock pulses, the communication bandwidth can be varied by selecting the number of clock pulses. In other words, serial to parallel conversion with a variable bandwidth management function is implemented.

Furthermore, the following functions are implemented because the variable parallel to serial conversion unit comprises a multiplexer, a second buffer circuit group, a second buffer circuit, and a variable parallel to serial conversion unit control section. The parallel signals that are output by the decoder group of the bandwidth allocation section are first input to the second buffer circuit group and temporarily stored therein. The parallel signals are output by the second buffer circuit group in accordance with the high-speed variable clock signal that is output by the second high-speed variable clock signal generator and input to the multiplexer. The parallel signals are converted into a serial signal by the multiplexer. The serial signal output by the multiplexer is input to the second buffer circuit and temporarily stored therein.

The details of the conversion from parallel signals to a serial signal in the variable parallel to serial conversion unit will be provided subsequently but such conversion is similar to the earlier case of conversion from a serial signal into parallel signals. That is, as a result of the method of setting the read signal that is supplied by the variable parallel to serial conversion unit control section that is input to the second buffer circuit, conversion to a serial signal is possible irrespective of the number of parallel signals. In other words, parallel to serial conversion with a variable bandwidth management function is implemented.

BRIEF DESCRIPTION OF THE DRAWINGS

The foregoing and other objects, features and advantages of the present invention will be better understood from the following description taken in connection with the accompanying drawings, in which.

DESCRIPTION OF THE PREFERRED EMBODIMENTS

An embodiment of the present invention will be described hereinbelow with reference to the drawings. Further, each of the drawings shows one constitutional example of the present invention and merely schematically shows the dispositional relationships of the respective constituent elements to an extent that allows the present invention to be understood. The present invention is not limited to the illustrated examples. Further, in the following description, although the number of specified parallels is assumed and specified constituent parts and so forth are sometimes used, this number is only a preferred example and, therefore, is not limited in any way. In the respective drawings, although identification numbers or identification codes for identifying signals propagated along channels per the arrows that follow the signal channels have been assigned, there are also cases where identification numbers that identify signals propagated along the channels are assigned directly to the channels with the omission of the arrows following the channels. Further, the same numbers are shown assigned to the same constituent elements and repetitive description is also sometimes omitted.

Code Division Multiplexing Optical Access Network System

Figure 1:
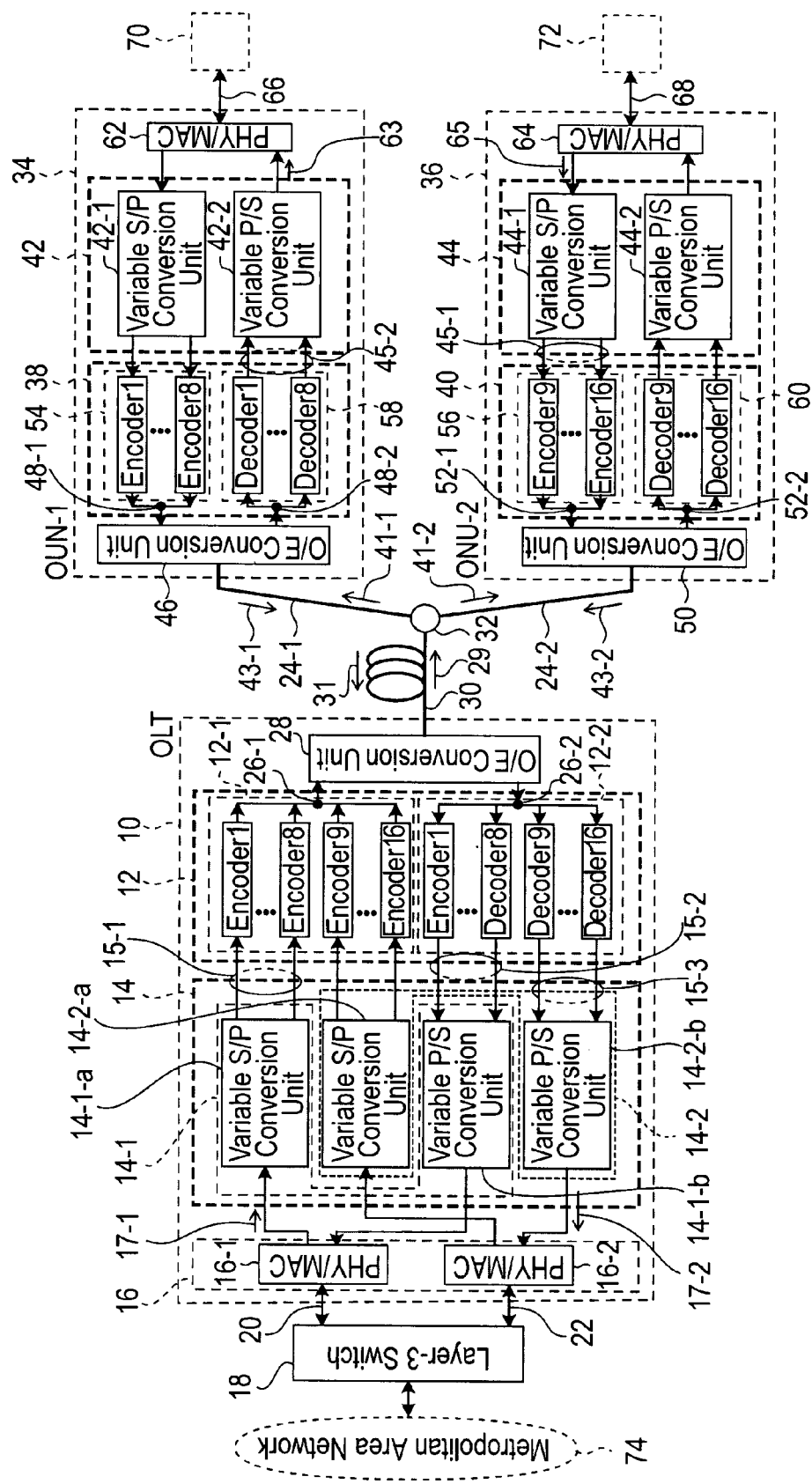
FIG. 1 is a schematic block constitutional view of a CDM optical access network system.

The constitution and operation of the code division multiplexing optical access network system of the present invention will now be described with reference to FIG. 1. FIG. 1 is a schematic block constitutional view of the code division multiplexing optical access network system of the present invention. In FIG. 1, although a case where the number of subscribers (number of users) is two, that is, where there are two optical network units is assumed, the results are the same for any number of subscribers and optical network units, irrespective of whether there are two subscribers and optical network units. Further, in order to identify a plurality of optical network units, there are also cases where the description is provided by labeling the optical network unit to which the first channel is allocated as ONU-1 and labeling the optical network unit to which the second channel is allocated as ONU-2. That is, an optical network unit 34 is ONU-1 and an optical network unit 36 is ONU-2. Because ONU-1 and ONU-2 have the same constitution, when the structure of ONU-1 and ONU-2 are described in the following description, provided there is no confusion, ONU-1 and ONU-2 are expressed simply as 'optical network units' and described without distinction.

The code division multiplexing optical access network system of the present invention is an optical access network system which performs two-way optical communications using a code division multiplexing system between an optical line terminal 10 which is a device that is installed on the provider side and the ONU-1 and ONU-2 which are devices that are installed on the user side. The optical line terminal 10 will also be referred to as the 'OLT' hereinbelow. The OLT and the plurality of optical network units (ONU-1 and ONU-2) are joined via an optical fiber channel 30, a star coupler 32, and a plurality of branched optical fiber channels (branched optical fiber channels 24-1 and 24-2). The optical fiber channel 30 has the star coupler 32 provided at one end thereof while the optical line terminal 10 is joined to the other end of the optical fiber channel 30. Further, the optical fiber channel 30 is split by the star coupler 32 into the branch optical fiber channel 24-1 and branch optical fiber channel 24-2 and ONU-1 and ONU-2 are joined to the branch optical fiber channels 24-1 and 24-2.

The characteristics of the code division multiplexing optical access network system of the present invention is constituted such that the optical line terminal 10 comprises a bandwidth control section 14 and a bandwidth allocation section 12. The bandwidth control section 14 comprises a number of signal converter pairs in a number equal to the number of optical network units (two here). In the example shown in FIG. 1, the number of optical network units is two and, hence, signal converter pairs 14-1 and 14-2 are provided. Furthermore, ONU-1 and ONU-2 each comprise bandwidth control sections 42 and 44 and bandwidth allocation sections 38 and 40. The bandwidth control sections 42 and 44 each comprise one set of signal converter pairs.

The bandwidth control sections, bandwidth allocation sections, and signal converter pairs which the optical line terminal 10 and the ONU-1 and ONU-2 each comprise have the same constitution. Hence, a description of these constitutions is provided in the form of a description of the constitution of the optical line terminal 10 and a description of the constitution of the ONU-1 and ONU-2 is omitted.

The signal converter pairs 14-1 and 14-2 provided in the optical line terminal 10 are constituted by one set of a variable serial to parallel conversion unit and a variable parallel to serial conversion unit each having a variable bandwidth management function. For example, the signal converter pair 14-1 is constituted as a set of a variable serial to parallel conversion unit 14-1-$a$ and a variable parallel to serial conversion unit 14-1-$b$. As shown in FIG. 1, the same is also true for signal converter pair 14-2.

The bandwidth allocation section 12 comprises an encoder group that comprises encoders 1 to 8 (EN-1 to EN-8) and an encoder group that comprises encoders 9 to 16. The encoder group comprising encoders 1 to 8 is an encoder group that is provided in correspondence with ONU-1 and the encoder group comprising encoders 9 to 16 (EN-9 to EN-16) is an encoder group that is provided in correspondence with ONU-2. Both encoder groups have the same constitution and operation and, therefore, a description will be provided here for the encoder group that is provided in correspondence with the optical network unit 34 (ONU-1). Further, FIG. 1 is shown with encoders 2 to 7 and encoders 10 to 15 omitted. Further, the decoders are similarly shown with decoders 2 to 7 and decoders 10 to 15 omitted.

Parallel signals 15-1 which are output by the variable serial to parallel conversion unit 14-1-$a$ are input to the encoder group (constituted by a plurality of encoders which are encoders 1 to 8). The number of parallel signals of the parallel signals 15-1 is determined in accordance with the length of a serial signal 17-1 which is supplied from a PHY/MAC interface 16-1 to the variable serial to parallel conversion unit 14-1-$a$. Hence, the longer the serial signal 17-1, the larger the number of parallel signals supplied by the variable serial to parallel conversion unit 14-1-$a$ to the encoders 1 to 8 constituting the encoder group is set and the larger the number of encoders to which the parallel signals are input.

In other words, when the length of the serial signal 17-1 is relatively short, the number of parallel signal may be one and, in this case, there is only one encoder to which the parallel signal is input. However, the number of parallel signals is established as a higher number in order from 2 to 8 as the length of the serial signal 17-1 increases, and, accordingly, the parallel signals are input to encoders 1 and 2, encoders 1, 2, and 3, encoders, 1, 2, 3, and 4, up to a maximum of all the encoders 1 to 8. In the case of the bandwidth allocation section 12 shown in FIG. 1, a maximum number of eight parallel signals can be set for the length of the serial signal 17-1.

Furthermore, the bandwidth allocation section 12 comprises a decoder group comprising decoders 1 to 8 (DE-1 to DE-8) and a decoder group that comprises decoders 9 to 16. The decoder group that comprises decoders 1 to 8 is a decoder group that is provided in correspondence with the encoders 1 to 8 of ONU-1 and the decoder group comprising the decoders 9 to 16 (DE-9 to DE-16) is a decoder group that is provided in correspondence with the encoders 9 to 16 of ONU-2. Both decoder groups have the same constitution and operation and, therefore, a description of the decoder group provided in correspondence with ONU-1 will be provided here.

A parallel signal 15-2 is input from the decoder group (constituted by a plurality of decoders which are the decoders 1 to 8) to the variable parallel to serial conversion unit 14-1-*b*. A serial signal that is output by an O/E conversion unit 28 is a signal that is obtained as a result of an optical code division multiplexed signal that has been produced by the encoding by the ONU-1 and ONU-2, multiplexing, and then transmission undergoing O/E conversion for generation as an electrical code division multiplexed signal. The electrical code division multiplexed signal is intensity-divided by the serial signal distributor 26-2 and then input to the decoders 1 to 16.

The codes established for each of the decoders 1 to 8 and the code established for each of the encoders 1 to 8 that the ONU-1 comprises are equal. Further, the code established for each of the decoders 9 to 16 and the code established for each of the encoders 9 to 16 that the ONU-2 comprises are equal. In other words, the code established for the decoder i that the optical line terminal 10 comprises and the code established for the encoder i that the ONU-1 comprises are equal, and the code established for the decoder j that the optical line terminal 10 comprises and the code established for encoder j that the ONU-2 comprises are equal. Here, i represents all the integers from 1 to 8 and j represents all the integers from 9 to 16.

Further, mutually different codes are set for the encoders 1 to 16 that the OLT comprises. Codes are then set for the decoders 1 to 16 that the ONU-1 and ONU-2 comprise in correspondence with the codes set for the encoders 1 to 16. Likewise, mutually different codes are set for the encoders 1 to 16 that ONU-1 and ONU-2 comprise. Codes are then set for the decoders 1 to 16 that the OLT comprises in correspondence with the codes set for the encoders 1 to 16.

Furthermore, the bandwidth allocation section 12 of the OLT comprises a parallel signal multiplexer 26-1 that multiplexes parallel signals output by the encoder group comprising encoders 1 to 16 and a serial signal distributor 26-2 that divides a serial signal in order to generate parallel signals which are input to the decoder group comprising decoders 1 to 16. The bandwidth allocation section 38 of the ONU-1 comprises a parallel signal multiplexer 48-1 that multiplexes parallel signals that are output by the encoder group comprising the encoders 1 to 8 and a serial signal distributor 48-2 that divides a serial signal in order to generate parallel signals which are input to the decoder group comprising decoders 1 to 8. The bandwidth allocation section 40 of the ONU-2 comprises a parallel signal multiplexer 52-1 that multiplexes parallel signals that are output from the encoder group comprising encoders 9 to 16 and a serial signal distributor 52-2 that divides a serial signal in order to generate parallel signals which are input to the decoder group comprising decoders 9 to 16.

The OLT comprises PHY/MAC interfaces 16-1 and 16-2. Generally, the PHY/MAC interfaces are desirably provided in a number that is equal to the number of optical network units. The code division multiplexing optical access network system of the present invention shown in FIG. 1 is a system comprising two optical network units and, therefore, the OLT comprises two PHY/MAC interfaces. The PHY/MAC interfaces 16-1 and 16-2 are each connected to a layer-3 switch 18 via 1000 Base-T Ethernets (registered trade name, likewise hereinafter) 20 and 22. That is, the PHY/MAC interfaces 16-1 and 16-2 are connected via the layer-3 switch 18 to a metropolitan area network 74 which is an external network.

Furthermore, ONU-1 and ONU-2 comprise PHY/MAC interfaces 62 and 64 respectively. The PHY/MAC interfaces 62 and 64 are connected via 1000 Base-T Ethernets 66 and 68 to transmission/reception signal processing sections 70 and 72 of the ONU-1 and ONU-2 respectively.

The O/E conversion unit 28 that the OLT comprises converts an optical code division multiplexed signal 31 supplied from the optical fiber channel 30 into an electrical code division multiplexed signal and supplies same to the serial signal distributor 26-2. In the case of the serial signal distributor 26-2, the electrical code division multiplexed signal is intensity-divided and output as parallel signals which are supplied to the decoder group 12-2 that the bandwidth allocation section 12 comprises. Further, the parallel signals output by the encoder group 12-1 that the bandwidth allocation section 12 comprises are input to the parallel signal multiplexer 26-1, output as a serial signal, and input to the O/E converter 28. The O/E converter 28 converts the serial signal into an optical serial signal 29 and outputs same to the optical fiber channel 30.

The O/E converter 28 plays the role of converting the optical code division multiplexed signal 31 that is supplied by the optical fiber channel 30 into an electrical code division multiplexed signal and the role of converting a serial signal that is output by the parallel signal multiplexer 26-1 into an optical serial signal 29. In other words, the O/E converter 28 plays the role of converting signals that are input to the bandwidth allocation section 12 that the OLT comprises into electrical signals and converting signals output by the bandwidth allocation section 12 into optical signals.

Here, a serial signal in optical form is represented as an 'optical serial signal' to distinguish same from a serial signal in electrical form. In the subsequent description, when it is necessary to similarly distinguish a serial signal either as an optical serial signal or an electrical serial signal, a serial signal in optical form is distinguished by being written as an optical serial signal.

An O/E converter 46 that the ONU-1 comprises converts the optical code division multiplexed signal 41-1 supplied by the optical fiber channel 24-1 into an electrical code division multiplexed signal and supplies same to a serial signal distributor 48-2. By intensity-dividing the electrical code division multiplexed signal, the serial signal distributor 48-2 supplies this signal as parallel signals to a decoder group 58 that the bandwidth allocation section 38 comprises. Furthermore, the parallel signals that are output by the encoder group 54 that the bandwidth allocation section 38 comprises are input to the parallel signal multiplexer 48-1, output as a serial signal, and input to the O/E converter 46. The O/E converter 46 converts the serial signal to an optical serial signal 43-1 and outputs same to the branched optical fiber channel 24-1.

In other words, the O/E converter 46 plays the role of converting signals input to the bandwidth allocation section 38 that the ONU-1 comprises into electrical signals and converting signals output by the bandwidth allocation section 38 into optical signals. Further, likewise, an O/E converter 50 that the ONU-2 comprises plays the role of converting signals input to the bandwidth allocation section 40 that the ONU-2 comprises into electrical signals and converting signals output by the bandwidth allocation section 40 into optical signals.

Here, when a signal that is addressed to the optical network unit (ONU-1) 34 to which the first channel is allocated is sent from the metropolitan area network 74 via the layer-3 switch 18 and introduced to the optical line terminal (OLT) 10 which is the center, the process up until delivery of the signal to the optical network unit (ONU-1) 34 will be described as per the signal flow.

The signal addressed to the ONU-1 which has passed from the metropolitan area network 74 via the layer-3 switch 18 before being introduced to the OLT is input to the PHY/MAC interface 16-1 is subjected to 4B5B conversion which converts every four bits of the signal into a five-bit data pattern and then input to a variable serial to parallel conversion unit 14-1-a that the bandwidth control section 14 comprises. The signal is then generated by the variable serial to parallel conversion unit 14-1-a as parallel signals 15-1 and output therefrom.

Thereupon, the number of parallel signals is set at 1 to 8 signals in accordance with the length of the signal addressed to the ONU-1 that is captured by the OLT. In other words, by setting the number of parallel signals of the variable serial to parallel conversion unit in accordance with the length of the signal addressed to ONU-1, it is possible to convert signals addressed to ONU-1 of a variety of lengths into parallel signals. Hence, supposing that the user to which ONU-1 has been allocated temporarily requires a large capacity bandwidth, the number of parallel signals is made a large number with respect to the variable serial to parallel conversion unit 14-1-a of the OLT which corresponds to the ONU-1 and a variable parallel to serial conversion unit 42-2 of the bandwidth control section 42 that the ONU-1 comprises. Thus, it is also possible to deal with cases where the user temporarily requires a large-capacity bandwidth.

The parallel signals 15-1 which are output from the variable serial to parallel conversion unit 14-1-a are input to the encoders 1 to 8 that the encoder group 12-1 comprises. Thereupon, when the number of parallel signals is i, parallel signals are input to the encoders 1 to i and no parallel signals are input to any other encoders. Here, i is an integer from 1 to 8. In other words, except for cases where the number of parallel signals is eight, encoders to which parallel signals are not input exist among the encoders 1 to 8 that the encoder group 12-1 comprises.

The parallel signals encoded by the encoders 1 to 8 that the encoder group 12-1 comprises are input to the parallel signal multiplexer 26-1 where the parallel signals are multiplexed, output as a serial signal, and then input to the O/E conversion unit 28. The O/E conversion unit 28 converts the serial signal into an optical serial signal 29 which is then output to the optical fiber channel 30.

The optical serial signal 29 that is propagated via the optical fiber channel 30 is branched by the star coupler 32 into branch optical serial signals 41-1 and 41-2 and input to the ONU-1 and ONU-2. The branch optical serial signal 41-2, which is input to the ONU-2, is input via the O/E converter 50 and the serial signal distributor 52-2. Here, because the code set for the decoders 9 to 16 that the decoder group 60 comprises and the code set for the encoders 1 to 8 that the encoder group 12-1 comprises are different, the codes are not decoded and not received as a signal. That is, this means that signals addressed to the optical network unit (ONU-1) 34 to which the first channel is allocated is not received by the optical network unit (ONU-2) 36 to which the second channel is allocated.

The branch optical serial signal 41-1 that is input to the ONU-1 is propagated via the branch optical fiber channel 24-1 and input to the O/E converter 46. The branch optical serial signal 41-1 that is input to the O/E converter 46 is converted to the electrical code division multiplexed signal and supplied to the serial signal distributor 48-2. The electrical code division multiplexed signal is intensity-divided by the serial signal distributor 48-2 and supplied to the decoder group 58 that the bandwidth allocation section 38 comprises.

Although parallel signals that have been intensity-divided by the serial signal distributor 48-2 are input to all of the decoders 1 to 8 that the decoder group 58 comprises, the decoding of the parallel signals by the decoders 1 to 8 is only performed on the signal components encoded by the encoder group 12-1 that the OLT which is the transmission side comprises. In other words, when the encoder group 12-1 has performed encoding as parallel signals for which the number of parallel signals is six, for example, only the signal components encoded by the encoders 1 to 6 are encoded by the decoders 1 to 6 that the decoder group 58 comprises. The signal components intensity-divided by the serial signal distributor 48-2 input to the decoders 7 and 8 are not mixed as signals. This process is not limited to cases where the number of parallel signals is six and is the same for any number from 1 to 8 of parallel signals.

The parallel signals that are output by the decoder group 58 are input to the variable parallel to serial conversion unit 42-2 and converted into a serial signal before being output. The serial signal converted by the variable parallel to serial conversion unit 42-2 and output is a signal with the same content as the serial signal addressed to the first channel that was supplied by the layer-3 switch 18 to the PHY/MAC interface 16-1 via the 1000 Base-T Ethernet 20.

A serial signal 63 that is converted by the variable parallel to serial conversion unit 42-2 and output is input to the PHY/MAC interface 62 where it undergoes 4B5B conversion and is transmitted to the transmission/reception signal processing section 70 via the 1000 Base-T Ethernet 6. This means that a signal addressed to the first channel that has been transmitted from the OLT to the OUN-1 is transmitted to the transmission/reception signal processing section 70 of the first channel.

Although the transmission path for signals addressed to the first channel was described in the above description, the same is also true for the transmission path for signals which are addressed to the second channel. The OLT is formed such that the constituent part of the first channel and the constituent part for the second channel are symmetrical. For example, the PHY/MAC interface 16-2, variable serial to parallel conversion unit 14-2-a and encoders 9 to 16 of the encoder group 12-1 correspond to the PHY/MAC interface 16-1 used for the first channel, the variable serial to parallel conversion unit 14-1-a and encoders 1 to 8 of the encoder group 12-1. Hence, in the above description, if the PHY/MAC interface 16-1, the variable serial to parallel conversion unit 14-1-a and the encoders 1 to 8 of the encoder group 12-1 are replaced by the PHY/MAC interface 16-2, variable serial to parallel conversion unit 14-2-a and the encoders 9 to 16 of the encoder group 12-2 respectively, the transmission path for signals addressed to the second channel can be similarly described. Further, ONU-1 and ONU-2 have the same structure and, therefore, in the above description, if the replacement with the constituent part of ONU-2 that corresponds to the constituent part of ONU-1 is made, the transmission path for signals addressed to the second channel can also be described in the same way.

Signals of the second channel that are transmitted from the transmission/reception signal processing section 72 of the second channel to the OLT will be described next with respect to the flow of the signals.

A signal of the second channel that are output by the transmission/reception signal processing section 72 of the second channel is input via the 1000 Base-T Ethernet 68 to the PHY/MAC interface 64 where the signal is subjected to 4B5B conversion that converts every four bits of the signal into a five-bit data pattern and then output. The serial signal 65 that has undergone 4B5B conversion by the PHY/MAC interface 64 and then output is input to a variable serial to parallel conversion unit 44-1 that the bandwidth control section 44 comprises where the signal is generated as parallel signals 45-1 which are then output. Thereupon, the number of parallel signals is set at 1 to 8 signals in accordance with the length of the signal of the second channel that is output by the transmission/reception signal processing section 72 of the second channel. In other words, by setting the number of parallel signals of the variable serial to parallel conversion unit in accordance with the length of the signal of the second channel, it is possible to convert signals of the second channel of a variety of lengths into parallel signals. Hence, supposing that the user to which the optical terminal device (ONU-2) 36 has been allocated temporarily requires a large capacity bandwidth for transmission to the OLT, the number of parallel signals is set at a large number with respect to the variable serial to parallel conversion unit 44-1 of the bandwidth control section 44 that the ONU-2 comprises and a variable parallel to serial conversion unit 14-2-b that the OLT comprises. Thus, it is also possible to deal with cases where the user temporarily requires a large-capacity bandwidth.

The parallel signals 45-1 that are output by the variable serial to parallel conversion unit 44-1 are input to the encoders 9 to 16 which the encoder group 56 comprises. Thereupon, when the number of parallel signals is (j+1), the parallel signals are input to the encoders 9 to (j+9) and not input to any other encoders. Here, j is an integer from 0 to 7. In other words, except for cases where the number of parallel signals is eight, encoders to which parallel signals are not input exist among the encoders 9 to 16 that the encoder group 56 comprises.

The parallel signals encoded by the encoders 9 to 16 that the encoder group 56 comprises are input to the parallel signal multiplexer 52-1, output as a serial signal, and then input to the O/E converter 50. The O/E converter 50 converts the serial signal into an optical serial signal 43-2 which is then output to the optical fiber channel 24-2.

The optical serial signal 43-2 that is propagated via the branched optical fiber channel 24-2 passes via the star coupler 32 and is propagated via the optical fiber channel 30 as an optical serial signal 31, input to the O/E converter 28 that the OLT comprises where it is O/E converted and output as a serial signal.

The serial signal that is output by the O/E conversion unit 28 is input to the serial signal distributor 26-2 and divided to form 8 signals that are input to the respective decoders 9 to 16 that the decoder group 12-2 comprises where the signals are decoded and output as parallel signals 15-3 of which there are eight. The parallel signals 15-3 are input to the parallel to serial conversion unit 14-1-c that the signal converter pair 14-2 comprises. The parallel signals 15-3 that are input to the variable parallel to serial conversion unit 14-1-c are generated as a serial signal 17-2 and output. The serial signal 17-2 is input to the PHY/MAC interface 16-2, undergoes 4B5B conversion before being output and input to the layer-3 switch 18 via the 1000 Base-T Ethernet 22. The serial signal obtained by subjecting the serial signal 17-2 to 4B5B conversion is output by the transmission/reception signal processing section 72 of the second channel and is a signal with the same content as the transmission signal of the second channel that is input to the PHY/MAC interface 64 that the optical network unit 36 comprises via the 1000 Base-T Ethernet 68 before being transmitted to the OLT.

The serial signal that is obtained by 4B5B-converting the serial signal 17-2 and inputting the converted signal to the layer-3 switch 18 is transmitted to the metropolitan area network 74 via the layer-3 switch 18. Here, the signal of the second channel transmitted by the optical network unit 36 to the OLT is transmitted to the metropolitan area network 74.

In the above description, the signal transmission path in a case where the signal of the second channel is transmitted from ONU-2 to the OLT was described. However, the same is also true for the transmission path for signals of the first channel. The ONU-2 to which the second channel has been allocated and the ONU-1 to which the first channel has been allocated have the same constitution.

Hence, the PHY/MAC interface 62, bandwidth control section 42, bandwidth allocation section 38 and O/E converter 46 of ONU-1 correspond to the PHY/MAC interface 64, bandwidth control section 44, bandwidth allocation section 40, and the O/E converter 50 of ONU-2 respectively, for example. Therefore, if the constituent part of ONU-2 and the corresponding constituent part of the ONU-1 are substituted in the above description, the transmission path of the signal of the second channel can be similarly described. In addition, because the constituent part used for the first channel of the OLT has a structure that is symmetrical to the constituent part used for the second channel, if a substitution for the constituent part used for the first channel that corresponds to the constituent part used for the second channel is made in the above description, the transmission path for signals of the first channel can be similarly described.

Variable Serial to Parallel Conversion Unit

Constitution

Figure 2:
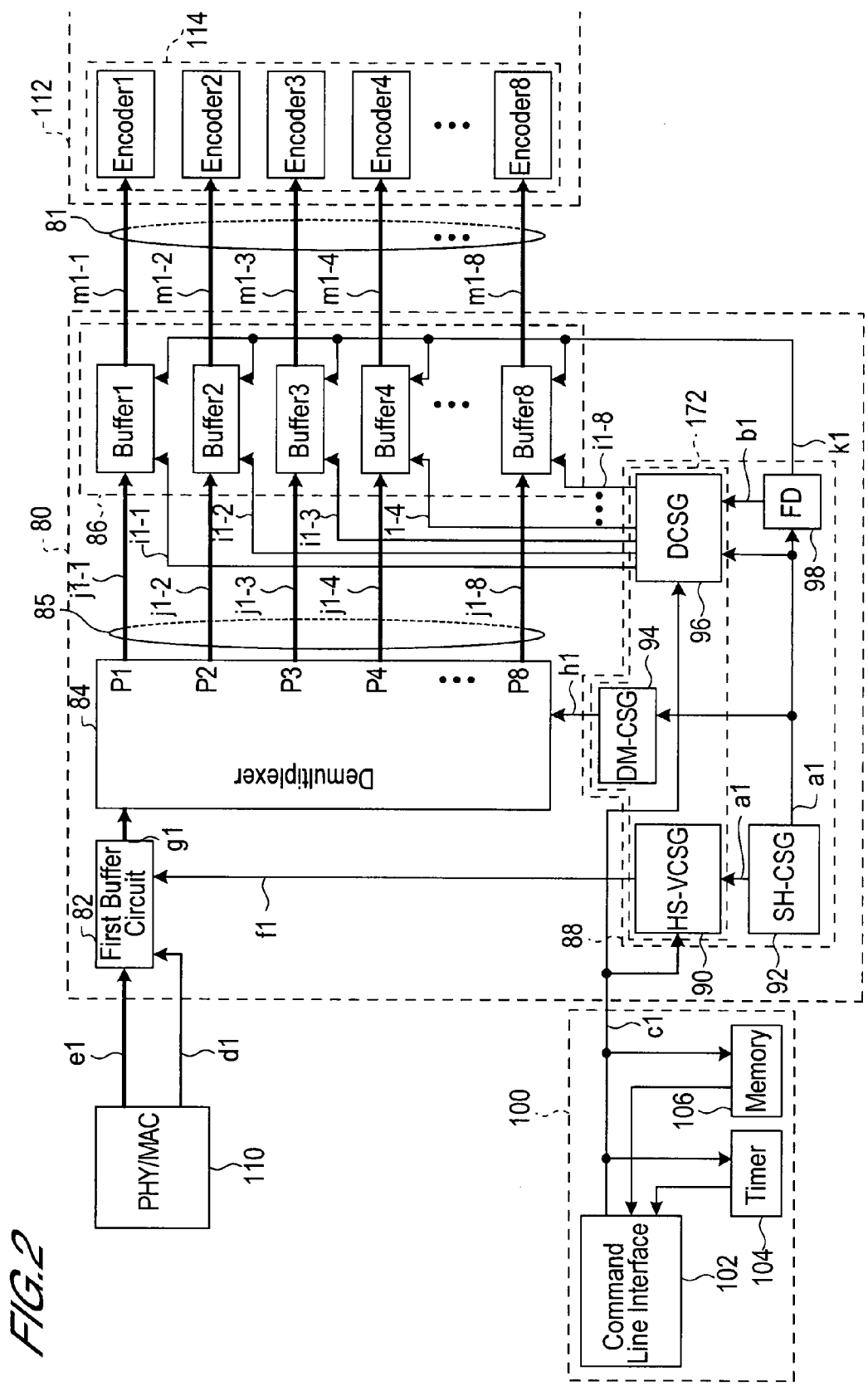
FIG. 2 is a schematic block constitutional view of a variable serial to parallel conversion unit.

The constitution of the variable serial to parallel conversion unit will now be described with reference to FIG. 2. FIG. 2 is a schematic block constitutional view of the variable serial to parallel conversion unit.

The variable serial to parallel conversion unit shown in FIG. 2 is installed as the variable serial to parallel conversion units 14-1-a and 14-2-a in the bandwidth control section 14 of the OLT of the code division multiplexing optical access network system shown in FIG. 1 and is installed as the variable serial to parallel conversion unit 42-1 in the bandwidth control section 42 of ONU-1 and as the variable serial to parallel conversion unit 44-1 in the bandwidth control section 44 of ONU-2.

The variable serial to parallel conversion unit 80 comprises a demultiplexer 84, a first buffer circuit 82, a first buffer circuit group 86, and a variable serial to parallel conversion unit control section 88. The demultiplexer 84 converts a serial signal g1 which is output by the first buffer circuit 82 into parallel signals 85. The parallel signals 85 correspond to the parallel signals 15-1 in FIG. 1, for example. The first buffer circuit 82 is installed between the PHY/MAC interface 110 and the, demultiplexer 84 and temporarily stores a serial signal e1 that is supplied from the PHY/MAC interface 110 and outputs this signal as a serial signal g1. The serial signal g1 is then input to the demultiplexer 84. The first buffer circuit group 86 temporarily stores the parallel signals 85 which are output by the demultiplexer 84 and generates and outputs the parallel signals 81. The parallel signals 81 are input to an encoder group 114 which a bandwidth allocation section 112 comprises.

The variable serial to parallel conversion unit control section 88 comprises a control signal generation section 172 and a high-speed clock signal generator 92 and frequency divider 98. The control signal generation section 172 comprises a demultiplexer control signal generator 94, a high-speed variable clock signal generator 90, and a delayed clock signal generator 96. In FIG. 2, the control signal generation section 172 is shown separately from the demultiplexer control signal generator 94, high-speed variable clock signal generator 90, and delayed clock signal generator 96 for the sake of expedience in describing the functions. However, as will be described subsequently, the aforementioned parts are sometimes also integrated in a circuit implementation.

The demultiplexer control signal generator 94 generates a switch changeover signal h1 of the demultiplexer 84 and supplies same to the demultiplexer 84. The high-speed variable clock signal generator 90 generates a read signal f1 of the first buffer circuit 82 and supplies same to the first buffer circuit 82. The delayed clock signal generator 96 generates write signals i1-1 to i1-8 for writing the parallel signals 85 which are the output signals from the demultiplexer 84 to the first buffer circuit group 86 and supplies the write signals i1-1 to i1-8 to the first buffer circuit group 86.

There is one signal line for transmitting the switch changeover signal hi supplied from the demultiplexer control signal generator 94 to the demultiplexer 84 in FIG. 2. However, a plurality of signal lines may be formed in a mount circuit.

The first buffer circuit group 86 is formed with eight buffer circuits (1 to 8) provided in parallel. The parallel signals 85 are temporarily stored and output as parallel signals 81. FIG. 2 shows a case where the first buffer circuit group 86 is constituted comprising eight buffer circuits in parallel, that is, a case where there is a maximum of eight parallel signals. However, the maximum number of parallel signals is not limited to eight.

In a case where the serial signal e1 is a transmission signal from the OLT to the ONU-1 or ONU-2, for example, the serial signal e1 corresponds to the serial signal 17-1 that is supplied by the PHY/MAC interface 16-1 to the variable serial to parallel conversion unit 14-1-$a$. Furthermore, when the serial signal e1 is a transmission signal from the ONU-1 or ONU-2 to the OLT, for example, the serial signal e1 corresponds to a serial signal 65 that is supplied by the PHY/MAC interface 64 that the optical network unit 36 comprises to the variable serial to parallel conversion unit 44-1.

The first buffer circuit group 86 temporarily stores parallel signals 85 output by the demultiplexer 84 and inputs the parallel signals 85 as parallel signals 81 to the bandwidth allocation section 112. Here, the bandwidth allocation section 112 collectively refers to the bandwidth allocation section 12 that the OLT comprises or the bandwidth allocation sections 38 and 40 that the ONU-1 and ONU-2 respectively comprise. Only a part of the bandwidth allocation section is illustrated in FIG. 2. In instances where the variable serial to parallel conversion unit control section 88 shown in FIG. 2 is installed in the OLT shown in FIG. 1, the parallel signals 81 output by the first buffer circuit group 82 correspond to the parallel signals 15-1 that are input to the bandwidth allocation section 12. Further, when the variable serial to parallel conversion unit control section 88 shown in FIG. 2 is installed in each of the ONU-1 and ONU-2 shown in FIG. 1, the parallel signals 81 output by the first buffer circuit group 82 correspond to the parallel signals 45-1 that are input to the bandwidth allocation sections 38 and 40. The constitution and operation of a bandwidth management section 100 will be described subsequently.

Operation

Figure 3:
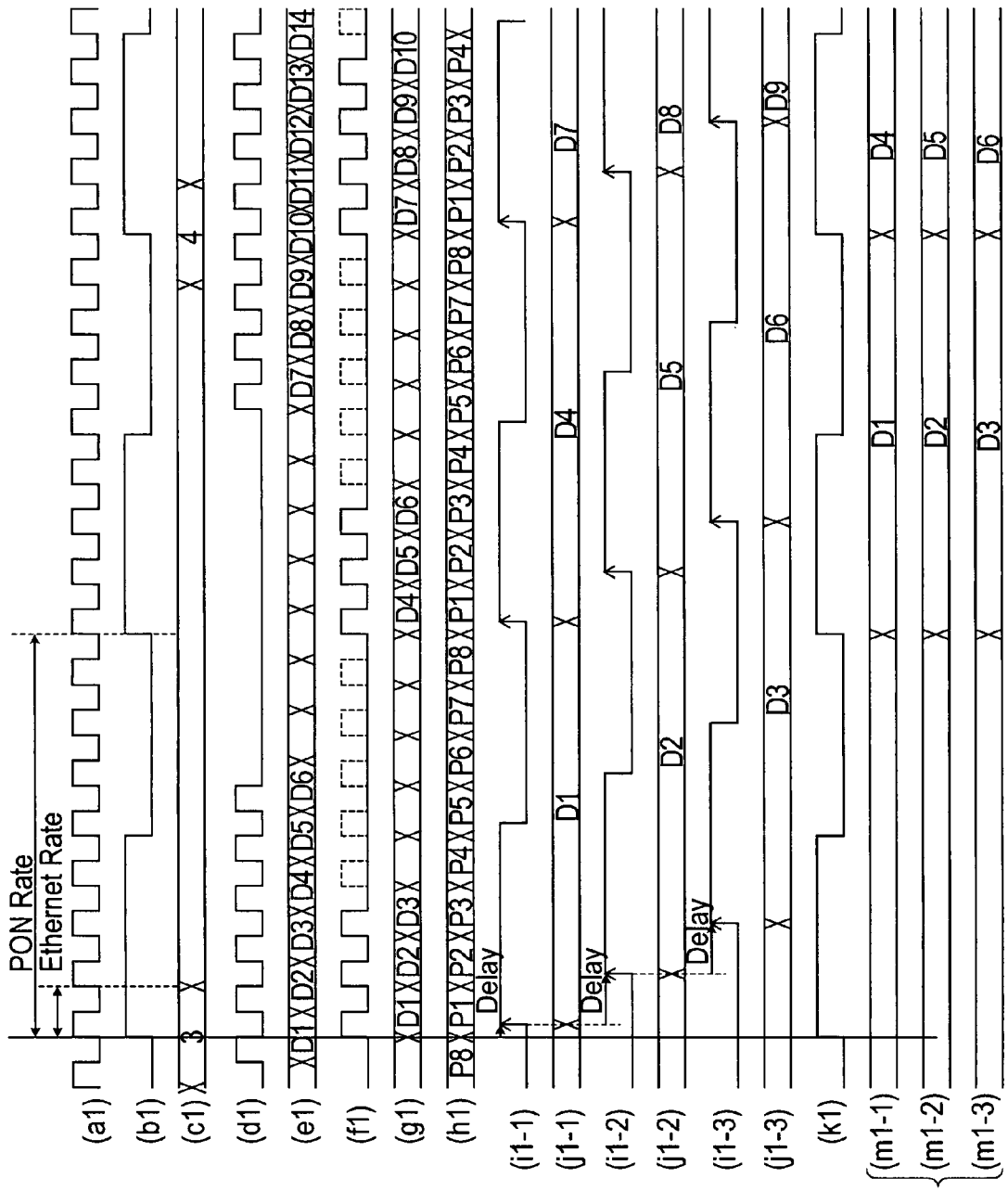
FIG. 3 is a timing chart that is supplied in the description of the operation of the variable serial to parallel conversion unit.

The operation of the variable serial to parallel conversion unit 80 will be described with reference to FIG. 3. FIG. 3 is a timing chart that is provided in the description of the operation of the variable serial to parallel conversion unit 80. For the sake of expediency in the description, FIG. 3 shows an example in which the number of buffer circuits that the first buffer circuit group 86 comprises in parallel is eight and the operation is described by assuming a case where the number of parallel signals processed is three. However, the following description is valid without being limited to these conditions.

The timing charts shown from the uppermost first stage to the lowermost eighteenth stage in FIG. 3 are as follows:

The time waveform (a1) shown in the first stage is a time waveform of a high-speed clock signal that is output by the high-speed clock signal generator (SH-CSG) 92 and supplied to the high-speed clock signal generator 90. Further, the same signal is also supplied by the high-speed clock signal generator 92 to the frequency divider 98, the demultiplexer control signal generator (DM-CSG) 94 and the delayed clock signal generator (DCSG) 96. The high-speed clock signal output by the high-speed clock signal generator 92 is also sometimes referred to as the high-speed clock signal a1. The frequency of the high-speed clock signal a1 is equal to the clock signal frequency of the 1000 Base-T Ethernet.

Subsequently, the signal representing the time waveform shown from the second stage of the timing chart also appears as the low-speed clock signal b1 and the bandwidth setting signal c1 by using the symbols b1 and c1 and so forth which are added to identify the respective time waveforms.

The time waveform (b1) shown in the second stage is the time waveform of the low-speed clock signal b1 output by the frequency divider (FD) 98. The low-speed clock signal b1 is a signal that is generated as a result of the high-speed clock signal a1 being divided by the frequency divider 98 and the frequency of the low-speed clock signal b1 is equal to the PON rate frequency which is the communication speed of the parallel signal.

The time waveform (c1) shown in the third stage is the time waveform of the bandwidth setting signal c1 that is supplied by the bandwidth management section 100 that will be described subsequently and is a setting signal for setting the number of parallel signals. This is a signal that is read by the high-speed variable clock signal generator 90 and delayed clock signal generator 96 in the control signal generation section 172 and which is used in order to determine the number of parallel signals in the variable serial to parallel conversion. FIG. 3 shows an aspect in which a signal for setting the number of parallel signals at three (the time waveform shown in the third stage is shown as '3') followed by a signal for setting the number of parallel signals at four (the time waveform shown in the third stage is shown as '4') are output. The specific signal format of the bandwidth setting signal c1 depends on the design of the bandwidth management section 100 and control signal generation section 172. In addition, although one line for transmitting the bandwidth setting signal c1 is shown in FIG. 3, a plurality of parallel transmission paths are also sometimes provided.

The time waveform (d1) shown in the fourth stage is a time waveform of a high-speed clock signal d1 that is supplied by the PHY/MAC interface 110 to the first buffer circuit 82 and which is in sync with the serial signal e1 output by the PHY/MAC interface 110 described subsequently.

The time waveform (e1) shown in the fifth stage is a time waveform of the serial signal e1 output by the PHY/MAC interface 110. Here, D1, D2, and D3 and so forth are signals representing the content of the data. The data content is represented in the form of a binary digital signal, for example. In the actual communications, D1, D2, and D3 and so forth are signals in the form of IP packets. The serial signal e1 is written to the first buffer circuit 82 by the high-speed clock signal d1.

The time waveform (f1) shown in the sixth stage is a time waveform of a high-speed variable clock signal f1 that is generated by the high-speed clock signal a1 and bandwidth setting signal c1 in the high-speed variable clock signal generator 90 as will be described subsequently. The high-speed variable clock signal f1 is supplied to the first buffer circuit 82 and functions as a read signal from the first buffer circuit 82.

In the illustration of the sixth stage that shows the time waveform of the high-speed variable clock signal f1, three clock pulses are first shown from left to right and then the three clock pulses are represented again with five time slots interposed therebetween. Further, four clock pulses are shown with five time slots interposed therebetween. In the illustration, a time slot in which a clock pulse is not present is shown by means of a thin line rectangular wave and a time slot in which a clock pulse is present is shown by means of a bold rectangular wave.

Data D1, D2, D3 of the serial signal e1 are first read by means of the high-speed variable clock signal f1 from the first buffer circuit 82 according to the row of three clock pulses contained in the initial cycle shown in FIG. 3 and data D4, D5, and D6 of the serial signal e1 are read according to the row of three clock pulses contained in the next cycle. Likewise, the data D7, D8, D9, and D10 of the serial signal e1 are read according to the row of four clock pulses contained in the next cycle.

The time waveform (g1) shown in the seventh stage is a time waveform of an output signal g1 of the first buffer circuit output by the first buffer circuit 82. The data D1, D2, . . . , which are components of the serial signal e1, are output by the first buffer circuit 82 in sync with the rectangular clock pulse of the high-speed variable clock signal f1.

The time waveform (h1) shown in the eighth stage is a time waveform of a switch changeover signal h1 that is output by the demultiplexer control signal generator 94 and supplied to the demultiplexer 84. The switch changeover signal h1 is in sync with the high-speed clock signal a1 and, by supplying the switch changeover signal h1 to the demultiplexer 84, sequential switching of the output ports of the demultiplexer 84 from P1 to P8 is performed in one cycle of the low-speed clock signal b1. Further, the timing of the switching of the output ports P1 to P8 of the demultiplexer 84 is also in sync with the timing of the reading of the output signal g1 of the first buffer circuit 82.

The time waveforms of the ninth, eleventh, and thirteenth stages (i1-1, i1-2, and i1-3 respectively) are the time waveforms of the delayed clock signals i1-1, i1-2, and i1-3 which are generated by the delayed clock signal generator 96 and supplied to the buffer circuits 1, 2, and 3 of the first buffer circuit group 86. The frequencies of the delayed clock signals i1-1, i1-2, and i1-3 are equal to the frequency of the delayed clock signal b1 and the respective lead times (the leading edge of the rectangular clock pulse in FIG. 3 is shown with an upward-facing arrow) have a delay added thereto for synchronization with the switching times of the output ports P1, P2, and P3 of the demultiplexer 84.

For example, the lead time of the delayed clock signal i1-1 is in sync with the output port P1 of the demultiplexer 84 of the switch changeover signal h1 and, as a result of the clock pulse thereof being supplied to the buffer circuit 1, data D1 which is a component of the serial signal e1 is written to the buffer circuit 1 in one cycle of the delayed clock signal i1-1. Likewise, the lead times of the delayed clock signals i1-2 and i1-3 are in sync with the output ports P2 and P3 of the demultiplexer 84 of the switch changeover signal h1 respectively and, as a result of the clock pulses thereof being supplied to the buffer circuits 2 and 3, data D2 and D3 which are components of the serial signal e1 are written to the buffer circuits 2 and 3 in one cycle of the delayed clock signals i1-2 and i1-3. Thereafter, the same is also true for data D4 to D8 which are components of the serial signal e1.

Here, signals are output by the output ports P4 to P8 of the demultiplexer 84 are not output to the buffer circuits 4 to 8 and, therefore, written signals are not present.

The time waveforms (j1-1, j1-2, and j1-3) shown in the tenth, twelfth and fourteenth stages are time waveforms of the parallel signal components j1-1, j1-2, and j1-3 which are output by the output ports P1 to P3 of the demultiplexer 84 and input to the buffer circuits 1 to 3.

The time waveform (k1) shown in the fifteenth stage is a time waveform of the low-speed clock signal k1 that is output by the frequency divider 98 and supplied to the first buffer circuit group 86 and is the same signal as the low-speed clock signal b1 shown in the second stage. The low-speed clock signal k1 functions as a read signal for reading the parallel signals 81 from the first buffer circuit group 86.

The time waveforms (m1-1 to m1-3) shown in the sixteenth to eighteenth stages are each time waveforms of the parallel signal components (m1-1 to m1-3) which are read and output from the first buffer circuit group 86 by means of the low-speed clock signal k1. Data D1 to D3 are output as parallel signal components (m1-1 to m1-3) in parallel from the buffer circuits 1 to 3 of the first buffer circuit group 86 in sync with the low-speed clock signal k1 and, in the next cycle of the low-speed clock signal k1, data D4 to D6 are output as parallel signal components (m1-1 to m1-3) in parallel from the buffer circuits 1 to 3 of the first buffer circuit group 86. In other words, the serial signal e1 that is output by the PHY/MAC interface 110 is converted into parallel signals 81 for which the number of parallel signals is three. Here, the parallel signals 81 are parallel signals for which the number of parallel signals is three and, therefore, the actual data are contained in the parallel signal components (m1-1 to m1-3) but actual data are not contained in the parallel signal components (m1-4 to m1-8).

In the description above, the time waveforms of data signals D1, D2, and so forth are shown schematically by copying the eye pattern of a digital signal with a bit rate equal to the bit rate of a high-speed clock signal or low-speed clock signal. However, in the actual communications, this eye pattern is an eye pattern of a digital signal with a high bit rate of at least a multiple of the bit rate of a high-speed clock signal or low-speed clock signal. In the case of the code division multiplexing optical access network system of the present invention, the above description is valid irrespective of the bit rate of the signal represented by the schematic eye pattern. Further, so too in the case of the subsequent description, time waveforms obtained by schematically copying the eye pattern of the digital signal are not explained.

The content that was described hereinabove with reference to the timing chart shown in FIG. 3 is arranged as follows.

The serial signal e1 that is input to the variable serial to parallel conversion unit 80 is first input to the first buffer circuit 82. The serial signal e1 that is temporarily stored in the first buffer circuit 82 is read as a serial signal g1 by means of a reading clock signal (high-speed variable clock signal f1) which is supplied to the first buffer circuit 82. Now, the variable serial to parallel conversion unit 80 is set to convert the serial signal g1 into parallel signals for which the number of parallel signals is three. Hence, the clock generation conditions of the high-speed variable clock signal generator 90 may be set such that the reading clock signal f1 that is supplied by the high-speed variable clock signal generator 90 continues on from the starting point of the PON-rate time slot in the PON-rate time slot and three interface rate clock pulses exist. As shown in FIG. 3, there are three continuous rectangular clock pulses of the reading clock signal (variable high-speed clock signal f1) while the high-speed variable clock signal generator 90 is set to convert the serial signal g1 into parallel signals for which the number of parallel signals is three by means of the bandwidth setting signal c1.

The demultiplexer 84 continues the operation in which the output ports are cyclically switched at the clock speed of the Ethernet interface. That is, in the time interval occupied by one clock of the interface-rate clock signal, the operation of switching from output port P1 to output port P2 and then from P2 to P3 is performed until switching to P8 has been carried out and then the operation of sequentially switching from P8 to P1, and from P1 to P2 is continued. The cycle until the output ports P1 to P8 have been switched is one cycle of the PON rate.

When the signal components are in a row in chronological order in one cycle of the PON rate, the content of the data carried by the serial signal g1 that is output by the first buffer circuit 82 is content such as (D1, D2, D3, 0, 0, 0, 0, 0). Here, the '0's signify that data is not present.

Therefore, data D1 are output from output port P1 of the demultiplexer 84, data D2 are output from P2, data D3 are output from P3 and data are not output at all from the P4, P5, P6, P7, and P8. Here, data contained in one time slot of the PON rate of the serial signal g1 (D1, D2, D3) are converted into parallel signals and output by the demultiplexer 84 as the parallel signals 85. An operation in which data contained in one time slot of the next PON rate of the serial signal g1 (D4, D5, D6) are likewise once again output as parallel signals 85 is then executed.

A delayed clock signal (here, because the number of parallel signals is three, i1-1 to 3 is indicated as the delayed clock signal) is supplied from the delayed clock signal generator 96 to the first buffer circuit group 86 in accordance with the switching timing for switching the output ports P1 to P8 of the demultiplexer 84. The delayed clock signals i1-1 and i1-2 that are output by the delayed clock signal generator 96 are signals for which the clock frequency is the PON rate and for which the delay signals are supplied to the demultiplexer 84 with the timing for the switching of the output ports of the demultiplexer 84. The time waveforms (i1-1, i1-2, and i1-3) shown in the ninth, eleventh and thirteenth stages are supplied with a delay for each single interface-rate time slot to the high-speed variable clock signal f1 (the delay amounts are shown by right-facing arrow in the time waveform shown in the ninth, eleventh, and thirteenth stages in FIG. 3). That is, a delay for each single interface-rate time slot is supplied sequentially to the parallel signal components j1-1, j1-2, and j1-3.

Therefore, the writing to the buffer circuits 1, 2, and 3 of the first buffer circuit group 86 is performed with the switching timing for switching the output ports P1, P2, and P3. As shown in the time waveforms shown in the ninth, eleventh, and thirteenth stages (i1-1, i1-2, and i1-3), writing of the data D1 to D3 to the buffer circuits 1 to 3 is carried out at the lead times of the respective delayed clock signals (i1-1, i1-2, and i1-3) (at the switching times of the switching to the output ports P1, P2, and P3). The next lead time of the delayed clock signal i1-1 is the switching time of the switching to the output port P1 of the next time slot after the end of one time slot of the PON rate, whereupon the writing of data D4 is carried out.

Here, because there is no need to write data to the buffer circuits 4 to 8, clock pulses are not supplied to these buffer circuits. That is, clock pulses are not supplied by the delayed clock signal generator 96 to the buffer circuits 4 to 8.

In order to read the written data D1, D2, and D3 from the buffer circuits 1, 2 and 3 of the first buffer circuit group 86, a reading clock signal k1 which is the clock frequency of the PON rate is supplied from the frequency divider 98 to the buffer circuits 1, 2, and 3. The reading clock signal k1 is a clock signal having the time waveform shown in the fifteenth stage of FIG. 3 and the same signal is supplied simultaneously to the buffer circuits 1, 2 and 3. As a result, the data D1, D2, and D3 which were written in parallel at the same time are output by the buffer circuits 1, 2 and 3. The parallel signals in which data D1, D2, and D3 are constituted in parallel are the parallel signals 81.

In order to change the number of parallel signals in the variable serial to parallel conversion unit 80, the number of clock pulses generated by the high-speed variable clock signal generator 90 is changed. In the example shown in FIG. 3, because a case where the number of parallel signals is three has been assumed, the number of clock signals generated by the high-speed variable clock signal generator 90 is set as a waveform that contains three consecutive clock pulses as per the high-speed variable clock signal f1 shown in the sixth stage of FIG. 3. The change in the number of parallel signals in the variable serial to parallel conversion unit 80 is performed by means of the bandwidth setting signal c1 that is supplied by the bandwidth management section 100 as will be described subsequently.

The writing to the first buffer circuit 82 is performed by means of the interface rate (high-speed clock signal d1) and the reading is carried out by means of a high-speed clock signal (high-speed variable clock signal f1). In other words, time slots in which clock pulses of the high-speed clock signal d1 are present are also present in time slots in which the clock pulses of the high-speed variable clock signal f1 which is the read signal are not present. Because time slots in which writing is executed even though reading is not performed are present, data for clock pulses that have are not input in the time slot remains in the first buffer circuit 82. As per the example shown in FIG. 3, reading when six bits of writing has been performed is performed for only three bits. Hence, in one time slot of the PON rate, three bits' worth of data are stored in the first buffer circuit 82 and an overflow is produced in the first buffer circuit 82. In other words, the average rate for the 6-bit writing is the interface rate and the average rate for the 3-bit reading is the PON rate.

When an overflow is produced, the layer-3 switch or the like shown in FIG. 1 is provided with a function for adjusting the transfer speed so that packets are not discarded. As a result, packets are transmitted from the optical line termination device 10 at the communication speed that corresponds to the PON rate. Here, the discarded packets are resent by means of the layer-3 switch.

The Ethernet TCP/IP (Transmission Control Protocol/Internet Protocol) is a standard according to which an ACK (acknowledgment) is not sent back and resending is continued until an ACK signal is sent back with the packet transmission timing delayed on the transmission side. Here, 'ACK signal' indicates a confirmation response or a setting response and signifies a response signal that is sent back to the transmission side in cases where the transmission side has been able to correctly receive data transmitted from the partner side by using a method of delivery confirmation in the communication. The transfer rate drops in proportion to the delay in the transmission timing that corresponds to the non-return of the ACK signal.

Electrical Mount Circuit of the Variable Serial to Parallel Conversion Unit

Constitution

Figure 4:
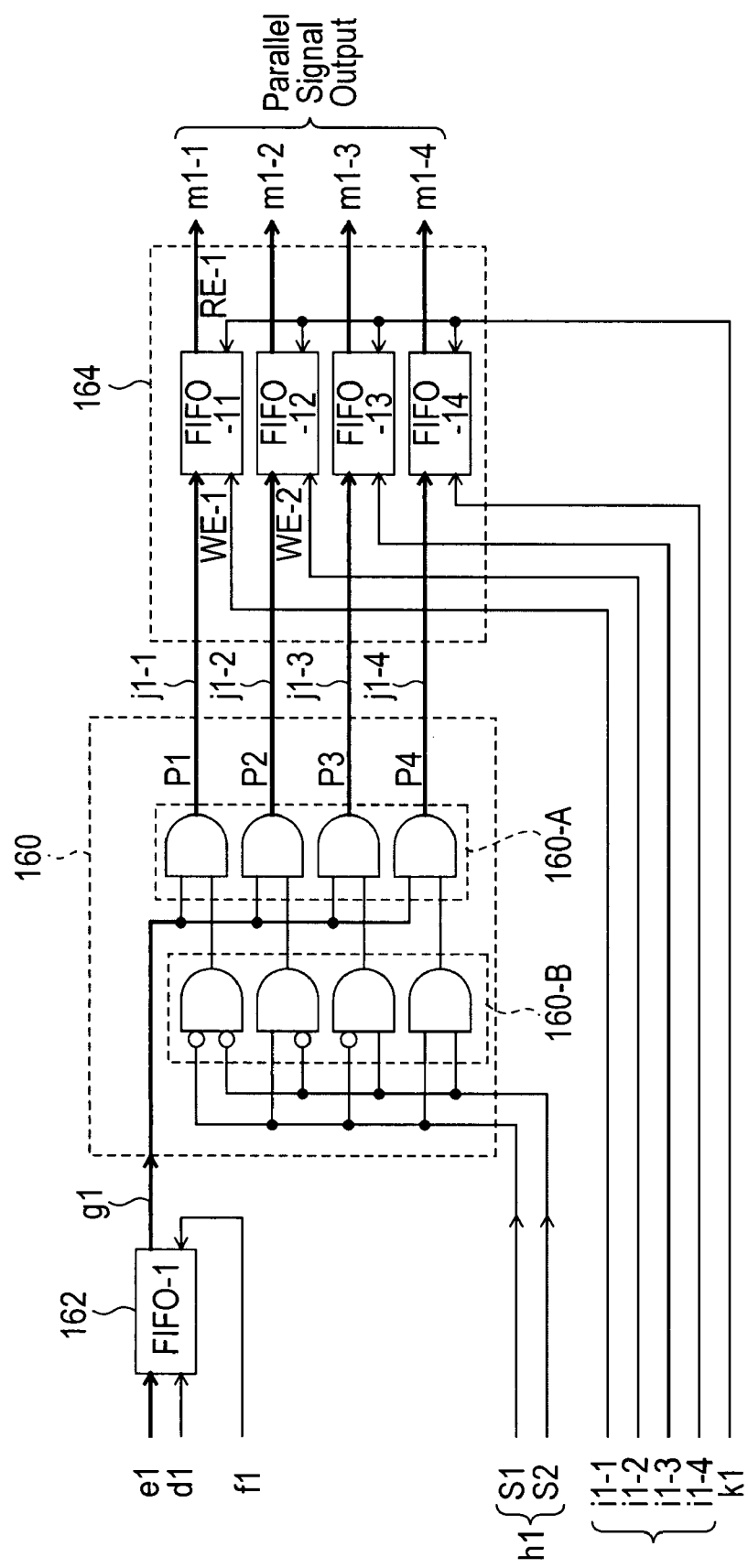
FIG. 4 is a schematic electrical circuit view of the variable serial to parallel conversion unit.

An example of the electrical mount circuit of the variable serial to parallel conversion unit will now be described with reference to FIG. 4. FIG. 4 is a schematic electrical circuit view of the variable serial to parallel conversion unit. In order to simplify the description, the description is made by assuming a case where the maximum number of parallel signals in the variable serial to parallel conversion is four and the number of output ports of a demultiplexer 160 corresponding to the demultiplexer 84 shown in FIG. 2 is four.

In the electrical mount circuit of the variable serial to parallel conversion unit shown in FIG. 4, the buffer circuits that constitute the first buffer circuit 82 and first buffer circuit group 86 shown in FIG. 2 are constituted by a FIFO (First In First Out) buffer circuit. In other words, the buffer circuit corresponding to the first buffer circuit 82 corresponds to the first stack memory 162 that uses the FIFO-1 in FIG. 4 and the buffer circuit group constituting the first buffer circuit group 86 corresponds to the first stack memory group 164 in FIG. 4. The buffer circuits constituting the first stack memory group 164 are FIFO-11 to 14.

In FIG. 4, because a FIFO is adopted for the buffer circuits that constitute the first buffer circuit and the first buffer circuit group, when it is necessary to identify the FIFO buffer circuits, same can be distinguished by assigning FIFO-1, FIFO-11, FIFO-12, FIFO-13, and FIFO-14, and identification numbers. In the following description, FIFO-1 is sometimes also used in place of the first stack memory 162. Further, the buffer circuits FIFO-11, FIFO-12, FIFO-13, and FIFO-14 which constitute the first stack memory group 164 are not judged as being buffer circuits that constitute the first stack memory 164 and are also referred to simply as FIFO-11, FIFO-12, FIFO-13, and FIFO-14.

FIFO are temporary storage devices (buffer devices) that function such that data are written thereto in a sequence that is input in accordance with a write clock signal (WE: Write Enable) and read thereto in a sequence that is written in accordance with the read clock signal (RE: Read Enable). In other words, a FIFO has the characteristic that there is no need for address control and reading is executed sequentially starting with signals for which writing has been performed.

The write signal input terminal of the FIFO will also be called 'WE' and the read signal input terminal of the FIFO is also referred to as 'RE'. Furthermore, in order to identify the write signal input terminals to the FIFO-11, FIFO-12, and FIFO-13, and so forth, identification numbers are sometimes shown added as 'WE-1', 'WE-2', and 'WE-3', and so forth. Likewise, in order to identify the read signal input terminals from the FIFO-11, FIFO-12, and FIFO-13, identification numbers are shown added as 'RE-1', 'RE-2', and 'RE-3', and so forth.

The demultiplexer 160 is constituted by an AND gate group 160-A which identifies the output ports P1 to P4, and an AND gate group 160-B which performs ON/OFF control of the data (D1, D2, and so forth) outputs.

Operation

Figure 5:
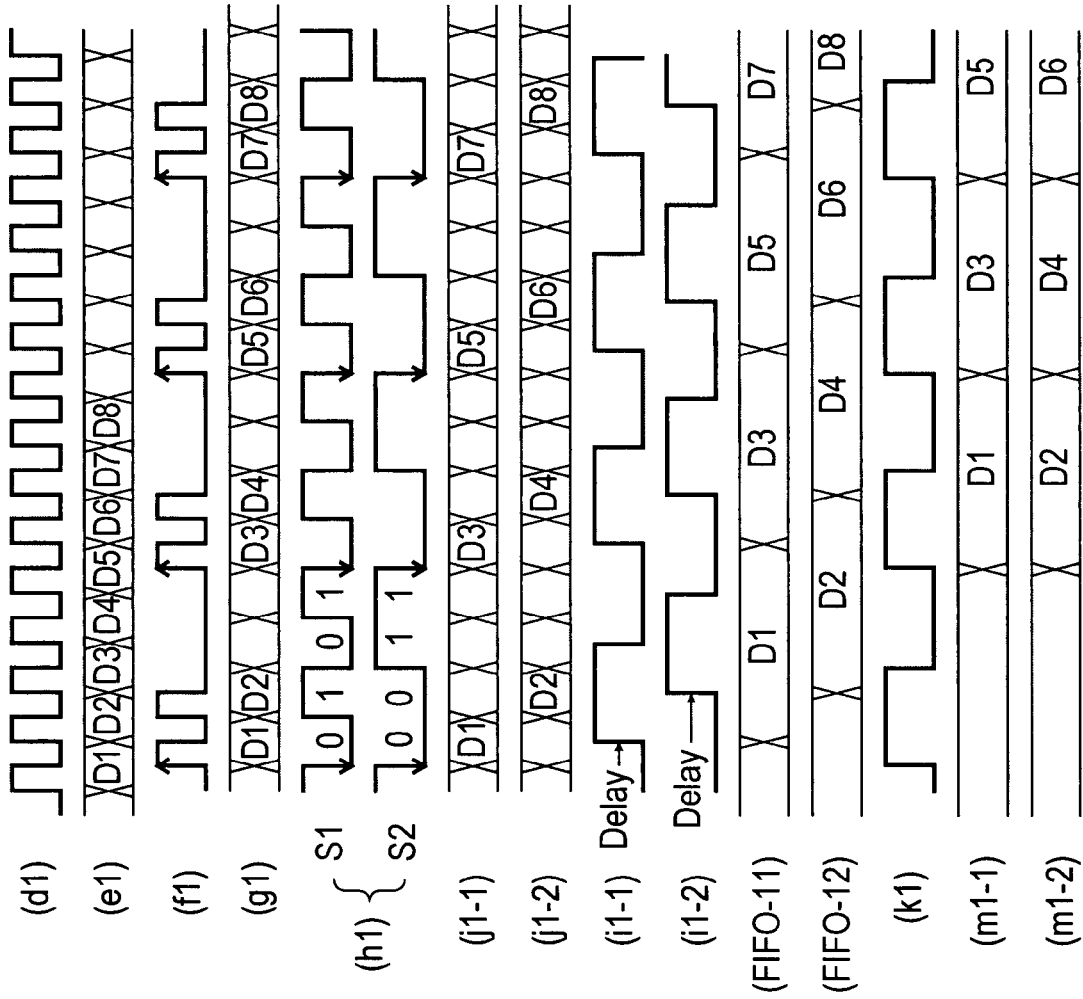
FIG. 5 is a timing chart that is supplied in the description of the operation that focuses on a branch circuit of the variable serial to parallel conversion unit.

The operation of the electrical mount circuit of a variable serial to parallel conversion unit will be described with reference to FIG. 5. FIG. 5 is a timing chart that is provided in the description of an operation that is centered on the demultiplexer of the variable serial to parallel conversion unit. For the sake of expediency, although an operation description is provided here by assuming a case where the number of parallel signals processed is two, the following description is valid and not limited to such conditions.

A timing chart that shows the uppermost first stage to the lowermost fifteenth stage in FIG. 5 is as follows.

The time waveform (d1) shown in the first stage is a time waveform for a high-speed clock signal d1 that is supplied by the PHY/MAC interface 110 shown in FIG. 2 to the FIFO-1. In other words, the high-speed clock signal d1 is a FIFO-1 write enable (WE: Write Enable) clock signal. As a result of the high-speed clock signal d1 (WE signal), data signals D1 to D8 are written from the serial signal e1 to the FIFO-1. The time waveform (e1) shown in the second stage is a time waveform for data signals D1 to D8 which is written to the FIFO-1.

The time waveform (f1) shown in the third stage is a time waveform for the high-speed variable clock signal f1 which is supplied by the high-speed variable clock signal generator 90 shown in FIG. 2 to the FIFO-1. That is, the high-speed variable clock signal f1 is a FIFO-1 read enable (RE: Read Enable) clock signal. The high-speed variable clock signal f1 (RE signal) has a set of continuous rectangular clock pulses of two bits each arranged in a row on the time axis at fixed intervals. As a result of the set of rectangular clock pulses of two bits each, the sets of data output (read) from the FIFO-1 are a set of data (D1, D2), a set of data (D3, D4), a set of data (D5, D6), and a set of data (D7, D8) which are input to the demultiplexer 160. The time waveform (g1) shown in the fourth stage is a time waveform for FIFO-1 output data signal g1 which is output by FIFO-1. The data D1 and D2 and so forth are arranged in a row on the time axis in one-for-one correspondence (synchronization) with the rectangular clock pulses of the high-speed variable clock signal f1.

The time waveform (h1) shown in the fifth and sixth stages is a select signal h1 for controlling the demultiplexer 160 which is output by the control signal generation section 172 and comprises a set of a select signal S1 and a select signal S2. The select signal h1 is a signal for switching the output ports P1, P2, P3, and P4 of the demultiplexer 160. The select signals S1 and S2 are rectangular waves comprising a rectangular clock pulse. Further, the select signal S2 is a rectangular wave with a frequency that is ½ that of the select signal S1 and the frequency of the select signal S1 is a frequency with a frequency that is ½ that of the high-speed clock signal d1.

The high-speed variable clock signal f1 and select signal h1 are synchronized so that there is a match between the lead time (labeled with an upward facing arrow) of the first clock pulse of the continuous rectangular clock pulses of two bits each of the high-speed variable clock signal f1, and the falling time (labeled with a downward facing arrow) of the select signals S1 and S2. The combination of values of the select signals S1 and S2 in one cycle of the high-speed variable clock signal f1 are (S1, S2)=(0, 0), (1, 0), (0, 1), and (1, 1). The variation with respect to (S1, S2) is repeated for each cycle of the high-speed variable clock signal f1.

The select signal h1 is input to the AND gate group 160-B as shown in FIG. 4. When the high-speed variable clock signal f1 is input to the AND gate group 160-B, when (S1-S2)=(0, 0), (1, 0), (0, 1), and (1, 1), a state where data signals are output by the output ports P1, P2, P3, and P4 of the demultiplexer 160 respectively is assumed.

The time waveforms (j1-1) and (j1-2) shown in the seventh and eighth stages respectively are time waveforms for the parallel signal components (j1-1) and (j1-2) that are output by the respective output ports P1 and P2 of the demultiplexer 160. Data D1, D3, D5, and D7 are output from output port P1 with the timing (S1, S2)=(0,0) and data D2, D4, D6, and D8 are output from output port P2 with the timing (S1, S2)=(1,0).

The time waveforms (i1-1) and (i1-2) shown in the ninth and tenth stages are time waveforms for the delayed clock signals i1-1 and i1-2 which are each generated and output by the control signal generation section 172. The delayed clock signals (i1-1) and (i1-2), are input to the WE clock signal input section of the WE-1 of FIFO-11 and the WE-2 of FIFO-12.

The time waveforms (FIFO-11) and (FIFO-12) shown in the eleventh and twelfth stages are time waveforms (FIFO-11) and (FIFO-12) for the data signals that are temporarily stored in the FIFO-11 and FIFO-12 respectively. The time waveform (k1) shown in the thirteenth stage is a time waveform for the low-speed clock signal k1 which is supplied by the variable serial to parallel conversion unit control section 88. By inputting the low-speed clock signal k1 to the RE clock signal input section of the FIFO-11 to FIFO-14 as RE clock signals of the FIFO-11 to FIFO-14, parallel signal components (m1-1 and m1-2) are output by the first stack memory group 164 in sync with the low-speed clock signal k1. The time waveforms shown in the fourteenth and fifteenth stages are time waveforms of the parallel signal components (m1-1 and m1-2).

Data (D1, D2) are output as parallel signal components (m1-1 and m1-2) in parallel from FIFO-11 and FIFO-12 in sync with the low-speed clock signal k1, data (D3, D4) are output in the next cycle of the low-speed clock signal k1, and data (D5, D6) are output in the next cycle again of the low-speed clock signal k1. In other words, the serial signal e1 that is output by the PHY/MAC interface 110 is converted into parallel signals for which the number of parallel signals is two. Here, because the number of parallel signals is two parallel signals, actual data are contained in the parallel signal components (m1-1 and m1-2) but actual data are not contained in the parallel signal components (m1-3 and m1-4).

Variable Parallel to Serial Conversion Unit Constitution

Figure 6:
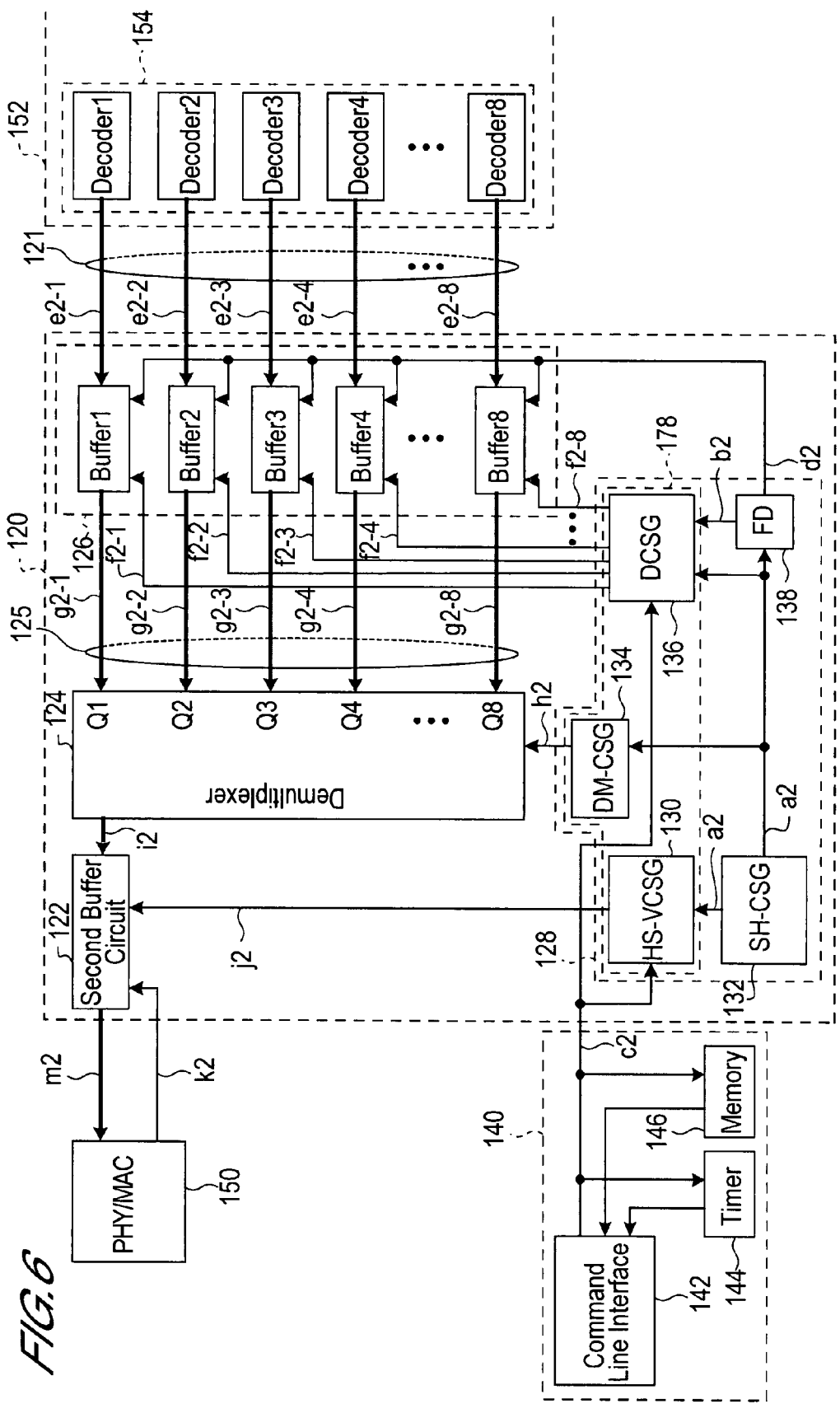
FIG. 6 is a schematic block constitutional view of a variable parallel to serial conversion unit.

The constitution of the variable parallel to serial conversion unit will now be described with reference to FIG. 6. FIG. 6 is a schematic block constitutional view of the variable parallel to serial conversion unit.

The variable parallel to serial conversion unit shown in FIG. 6 is installed as variable parallel to serial conversion units 14-1-b and 14-2-b in the bandwidth control section 14 of the OLT of the code division multiplexing optical access network system shown in FIG. 1, installed as a variable parallel to serial conversion unit 42-2 in the bandwidth control section 42 of ONU-1 and installed as a variable parallel to serial conversion unit 44-2 in the bandwidth control section 44 of ONU-2.

A variable parallel to serial conversion unit 120 comprises a multiplexer 124, a second buffer circuit 122, a second buffer circuit group 126, and a variable parallel to serial conversion unit control section 128. The multiplexer 124 converts the parallel signals 125 that are output by the second buffer circuit group 126 into a serial signal i2. The serial signal i2 corresponds to the serial signal 17-2 in FIG. 1, for example. The second buffer circuit 122 is installed between the PHY/MAC interface 150 and the multiplexer 124. The serial signal i2 supplied to the PHY/MAC interface 150 is temporarily stored and output as a serial signal m2. The parallel signals 125 are input to the multiplexer 124. The second buffer circuit group 126 temporarily stores parallel signals 121 input to the multiplexer 124 and outputs same as the parallel signals 125. The parallel signals 121 are output from the decoder group 154 that a bandwidth allocation section 152 comprises.

The variable parallel to serial conversion unit control section 128 comprises a control signal generation section 178, a high-speed clock signal generator 132, and a frequency divider 138. The control signal generation section 178 comprises a multiplexer control signal generator 134, a high-speed variable clock signal generator 130, and a delayed clock signal generator 136. In FIG. 6, the control signal generation section 178 is shown separately from the multiplexer control signal generator 134, high-speed variable clock signal generator 130, and delayed clock signal generator 136 for the sake of expediency in the description of the functions. However, as will be described subsequently, the foregoing components are sometimes constituted integrated mounted on a circuit.

The multiplexer control signal generator 134 generates a switch changeover signal h2 for the multiplexer 124 and supplies this signal the multiplexer 124. The high-speed variable clock signal generator 130 generates a read signal j2 for the second buffer circuit 122 and supplies the read signal j2 to the second buffer circuit 122. The delayed clock signal generator 136 generates read signals f2-1 to f2-8 for reading the parallel signals 125 which are input signals that are input to the multiplexer 124 from the second buffer circuit group 126 and supplies the read signals f2-1 to f2-8 to the second buffer circuit group 126.

In FIG. 6, one signal path for transmitting the switch changeover signal h2 from the multiplexer control signal generator 134 to the multiplexer 124 is shown but this signal path is formed by means of a plurality of signal lines in the mount circuit.

The second buffer circuit group 126 is formed with eight buffer circuits (1 to 8) provided in parallel and the parallel signals 121 are temporarily stored and output as parallel signals 125. Although FIG. 6 shows a case where the second buffer circuit group 126 is constituted comprising eight buffer circuits in parallel, that is, a case where the maximum number of parallel signals is eight, the maximum number of parallel signals is not limited to eight.

In cases where the serial signal m2 is a transmission signal from the ONU-1 or ONU-2 to the OLT, the serial signal m2 corresponds to a serial signal 17-2 which is supplied from the variable parallel to serial conversion unit 14-2-b to the PHY/MAC interface 16-2 that the OLT comprises, for example. Further, in cases where the serial signal m2 is a transmission signal from the OLT to the ONU-1 or ONU-2, for example, the serial signal m2 corresponds to the serial signal 63 that is supplied from the variable parallel to serial conversion unit 42-2 to the PHY/MAC interface 62 that the ONU-1 comprises, for example.

The high-speed variable clock signal generator 130 supplies the read signal j2 to the second buffer circuit 122. The second buffer circuit group 126 temporarily stores the parallel signals 121 output by the bandwidth allocation section 152 and inputs the parallel signals 121 to the multiplexer 124 as parallel signals 125. The bandwidth allocation section 152 as it is intended here collectively refers to the bandwidth allocation section 12 that the OLT comprises or the respective bandwidth allocation sections 38 and 40 that the ONU-1 and ONU-2 comprise. FIG. 6 illustrates only a portion of the bandwidth allocation section. When the variable parallel to serial conversion unit 120 shown in FIG. 6 is installed in the OLT shown in FIG. 1, the parallel signals 125 output by the second buffer circuit group 126 correspond to the parallel signals 15-2 output by the bandwidth allocation section 12. Furthermore, when the variable parallel to serial conversion unit 120 shown in FIG. 6 is installed in the ONU-1 and ONU-2 shown in FIG. 1 respectively, the parallel signals 125 output by the second buffer circuit group 126 correspond to the parallel signals 45-2 output by the bandwidth allocation sections 38 and 40 respectively.

Operation

Figure 7:
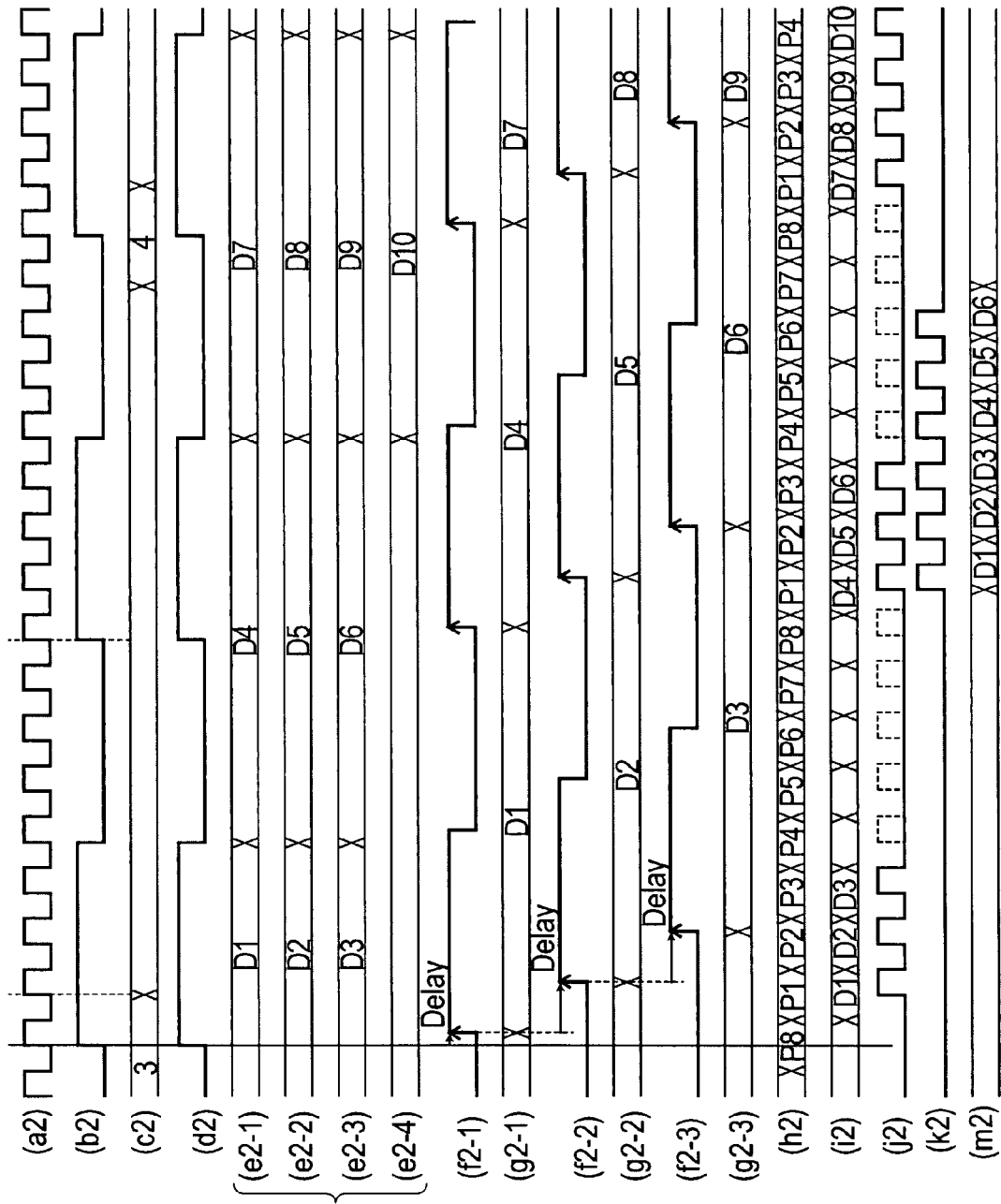
FIG. 7 is a timing chart that is supplied in the description of the operation of the variable parallel to serial conversion unit.

The operation of the variable parallel to serial conversion unit 120 will now be described with reference to FIG. 7. FIG. 7 is a timing chart that is provided in the description of the operation of the variable parallel to serial conversion unit. For the sake of expediency in the description, FIG. 7 shows an example where the number of buffer circuits that the second buffer group 126 comprises in parallel is eight and, although a case where an operation description is provided by assuming a case where the number of parallel signals processed is three, the following description is valid without being limited to these conditions.

Timing charts that show the first uppermost stage to the lowermost nineteenth stage in FIG. 7 are as follows.

The time waveform (a2) shown in the first stage is a time waveform of a high-speed clock signal that is output by the high-speed clock signal generator 132 and supplied to the high-speed variable clock signal generator 130. Further, the same signal is also supplied by the high-speed clock signal generator 132 to the frequency divider 138, the multiplexer control signal generator 134 and the delayed clock signal generator 136. The high-speed clock signal output by the high-speed clock signal generator 132 is also referred to as the high-speed clock signal a2. The frequency of the high-speed clock signal a2 is equal to the frequency of a 1000 Base-T Ethernet clock signal.

Subsequently, the signals representing the time waveforms shown in the second stage and subsequent stages of the timing chart also likewise appear as a low-speed clock signal b2 and a bandwidth setting signal c2 or the like by using the symbols b2 and c2 that are assigned in order to identify the respective time waveforms.

The time waveform (b2) shown in the second stage is a time waveform of the low-speed clock signal b2 that is output by the frequency divider 138. The low-speed clock signal b2 is a signal that is generated as a result of the high-speed clock signal a2 being divided by the frequency divider 138 and the frequency of the low-speed clock signal b2 is equal to the PON rate frequency which is the communication speed of the parallel signals.

The time waveform (c2) shown in the third stage is a time waveform for the bandwidth setting signal c2 that is supplied by a bandwidth management section 140 and is a setting signal for setting the number of parallel signals. This is a signal that is read by the high-speed variable clock signal generator 130 and delayed clock signal generator 136 in the control signal generation section 178 and which is used to determine the number of parallel signals in the variable parallel to serial conversion. FIG. 7 shows an aspect in which a signal for setting the number of parallel signals at three (written as '3' in the time waveform shown in the third stage) and a signal for then setting the number of parallel signals as four (written as '4' in the time waveform shown in the third stage) are output. The format of the specific signal for the bandwidth setting signal c2 is a matter concerning the design of the bandwidth management section 140 and the control signal generation section 178. Further, there is one line via which the bandwidth setting signal c2 is transmitted in FIG. 6 but a plurality of parallel transmission paths may also be provided.

The time waveform (d2) shown in the fourth stage is a time waveform for a low-speed clock signal d2 that is output by the frequency divider 138 and supplied to the second buffer circuit group 126 and is the same signal as the low-speed clock signal b2 shown in the second stage. The low-speed clock signal d2 functions as a write signal for the parallel signals to the second buffer circuit group 126.

The time waveforms (e2-1 to e2-4) shown in the fifth to eighth stages are time waveforms for the parallel signal components (e2-1 to e2-4) that are input to and written to the second buffer circuit group 126 by means of the low-speed clock signal d2. The parallel signals 121 that are output by the decoder group 154 that the bandwidth allocation section 152 comprises are in sync with the low-speed clock signal d2 and data D1 to D3 are input as parallel signal components (e2-1 to e2-3) of the parallel signals 121 in parallel to the buffer circuits 1 to 3 of the second buffer circuit group 126. Data D4 to D6 are input as parallel signal components (e2-1 to e2-3) in parallel to the buffer circuits 1 to 3 of the second buffer circuit group 126 in the next cycle of the low-speed clock signal d2.

That is, data D1, D2, and D3 are each first output simultaneously in sync with the cycles of the low-speed clock signal d2 by the decoders 1, 2 and 3 of the decoder group 154. In the next cycle of the low-speed clock signal d2, data D4, D5, and D6 are output simultaneously by the decoders 1, 2, and 3 and, in the next cycle again, data D7, D8, and D9 are simultaneously output. Further, data are not output by the decoders 4, 5, 6, 7, or 8.

FIG. 7 shows, including comments, a case where, following conversion of the parallel signals for which the number of parallel signals is three into a serial signal, the number of parallel signals is changed to four. Hence, following signals for which the number of parallel signals has been designated as three in the bandwidth setting signal c2, a signal for which the number of parallel signals has been designated as four appears in a position close to the right-hand side of FIG. 7. Hence, FIG. 7 shows an aspect where, after data D7, D8, and D9 have been simultaneously output by the decoders 1, 2, and 3, data D10 are output by decoder 4. However, as long as the number of parallel signals is three, data are not output by the decoders 4, 5, 6, 7, and 8.

The time waveforms (f2-1, f2-2, and f2-3) shown in the ninth, eleventh, and thirteenth stages are time waveforms of the delayed clock signals f2-1, f2-2, and f2-3 that are generated by the delayed clock signal generator 136 and supplied to the respective buffer circuits 1, 2, and 3 of the second buffer circuit group 126. The frequencies of the delayed clock signals f2-1, f2-2, and f2-3 are equal to the frequencies of the low-speed clock signal b2 and the respective lead times (the leading edge of the rectangular clock pulse is shown with the upward-facing arrow in FIG. 7) have a delay applied thereto in order to establish synchronization with the switching times of Q1, Q2, and Q3 of the input ports of the multiplexer 124.

For example, because the lead time of the delayed clock signal f2-1 is in sync with Q1 of the input port of the multiplexer 124 of the switch changeover signal h2 which is supplied by the multiplexer control signal generator 134 (described subsequently) and the clock pulse of the delayed clock signal is supplied by the buffer circuit 1, data D1 which is a component of the serial signal i2 is read from the buffer circuit 1 in one cycle of the delayed clock signal f2-1. Likewise, because the lead times of the delayed clock signals f2-2 and f2-3 are in sync with the capture times Q2 and Q3 of the input port of the multiplexer 124 of the switch changeover signal h2 and the clock pulses of the delayed clock signals are supplied to the buffer circuits 2 and 3, data D2 and D3 which are components of the serial signal i2 are read from the buffer circuits 2 and 3 in one cycle of the delayed clock signals f2-2 and f2-3. The same is also true for data D4 to D8 which are components of the serial signal i2.

Here, because signals are not output by the decoders 4 to 8 of the decoder group 154 to the buffer circuits 4 to 8, written signals do not exist.

The time waveforms (g2-1, g2-2 and g2-3) that are shown in the tenth, twelfth, and fourteenth stages are time waveforms for the parallel signal components g2-1, g2-2 and g2-3 that are output by the buffer circuits 1 to 3 and input to the respective input ports Q1 to Q3 of the multiplexer 124.

The time waveform (h2) shown in the fifteenth stage is a time waveform of a switch changeover signal h2 that is output by the multiplexer control signal generator 134 and supplied to the multiplexer 124. The switch changeover signal h2 is in sync with the high-speed clock signal a2 and, as a result of the switch changeover signal h2 being supplied to the multiplexer 124, the input ports of the multiplexer 124 are sequentially switched from Q1 to Q8 in one cycle of the low-speed clock signal b2. Further, the timing of the switching of the input ports Q1 to Q8 of the multiplexer 124 is also in sync with the timing of the writing of the input signal i2 of the second buffer circuit 122.

The time waveform (i2) shown in the sixteenth stage is a time waveform of the output signal i2 of the multiplexer 124 that is input to the second buffer circuit 122. Data D1, D2 ... which are components of the serial signal m2 are input to the second buffer circuit 122 in sync with the rectangular clock pulses of the high-speed variable clock signal j2 (described subsequently).

The time waveform (j2) shown in the seventeenth stage is a time waveform of the high-speed variable clock signal j2 that is generated from the high-speed clock signal a2 and the bandwidth setting signal c2 in the high-speed variable clock signal generator 130. The high-speed variable clock signal j2 is supplied to the second buffer circuit 122 and functions as a write signal for writing to the second buffer circuit 122.

In the illustration of the seventeenth stage that shows the time waveform of the high-speed variable clock signal j2, three clock pulses are first shown from left to right and then the three clock pulses are represented again with five time slots interposed therebetween. Further, four clock pulses are shown with five time slots interposed therebetween. In the illustration, a time slot in which a clock pulse is not present is shown by means of a thin line rectangular wave and a time slot in which a clock pulse is present is shown by means of a bold rectangular wave.

Data D1, D2, D3 of the parallel signals 125 are first written by means of the high-speed variable clock signal j2 in the first cycle to the second buffer circuit 122 according to the row of three clock pulses contained in the initial cycle and data D4, D5, and D6 of the parallel signals 125 are read according to the row of three clock pulses contained in the next cycle. Likewise, the data D7, D8, D9, and D10 of the parallel signals 125 are written according to the row of four clock pulses contained in the next cycle.

The time waveform (k2) shown in the eighteenth stage is a time waveform of the high-speed clock signal k2 that is in sync with the parallel signals 125 that are supplied from the PHY/MAC interface 150 to the second buffer circuit 122.

The time waveform (m2) shown in the nineteenth stage is a time waveform of the serial signal m2 that is input to the PHY/MAC interface 150. Here, D1, D2, and D3 and so forth are signals that represent the data content. The content of the data is represented in the form of a binary digital signal, for example. In the actual communications, D1, D2, and D3 are signals are shown in the IP packet format. The serial signal m2 is read by the second buffer circuit 122 by means of the high-speed clock signal k2.

As described hereinabove, the parallel signals 121 for which the number of parallel signals is three is converted into a serial signal m2 by the variable parallel to serial conversion unit 120 and then input to the PHY/MAC interface 150. Here, because the number of parallel signals of the parallel signals 121 is three, actual data are contained in the parallel signal components (e2-1 to e2-3). However, actual data are not contained in the parallel signal components (e2-4 to e2-8).

As per FIG. 3, in FIG. 7, the time waveforms of data signals D1, D2, and so forth are shown schematically by copying the eye pattern of a digital signal with a bit rate equal to the bit rate of a high-speed clock signal or low-speed clock signal.

The content that was described hereinabove with reference to the timing chart shown in FIG. 7 is arranged as follows.

The parallel signals 121 that are input to the variable parallel to serial conversion unit 120 are first input to the second buffer circuit group 126. The parallel signals 121 that are temporarily stored in the second buffer circuit group 126 are read as parallel signals 125 by means of a reading clock signal (delayed clock signals f2-1 to f2-8) which are supplied to the second buffer circuit group 126. Now, the variable parallel to serial conversion unit 120 is set to convert the parallel signals 125 for which number of parallel signals is three into a serial signal. Hence, the clock generation conditions of the high-speed variable clock signal generator 130 may be set such that the reading clock signal j2 that is supplied by the high-speed variable clock signal generator 130 continues on from the starting point of the PON-rate time slot in the PON-rate time slot and three interface rate clock pulses exist. As shown in FIG. 7, there are three continuous rectangular clock pulses of the reading clock signal (variable high-speed clock signal j2) while the high-speed variable clock signal generator 130 is set to convert the parallel signals into parallel signals for which the number of parallel signals is three by means of the bandwidth setting signal c2.

The multiplexer 124 continues the operation of cyclically switching the input ports at the clock speed of the Ethernet interface. That is, in the time interval occupied by one clock of the clock signal of the interface rate, the operation of switching from input port Q1 to Q2 and then from Q2 to Q3 is performed until switching to Q8 has been carried out and then the operation of sequentially switching from Q8 to Q1, and from Q1 to Q2 is continued. The cycle until the input ports Q1 to Q8 have been switched is one cycle of the PON rate.

When the signal components are in a row in chronological order in one cycle of the PON rate, the content of the data carried by the serial signal i2 that is input to the second buffer circuit 122 is content such as (D1, D2, D3, 0, 0, 0, 0, 0). Here, the '0's signify that data is not present.

Therefore, data D1 are input to input port Q1 of the multiplexer 124, data D2 are input to Q2, data D3 are input to Q3 and data are not output at all to Q4, Q5, Q6, Q7, and Q8. Here, data (D1, D2, D3) contained in one time slot of the PON rate are output by the multiplexer 124 as the serial signal i2. An operation in which data contained in one time slot of the next PON rate (D4, D5, D6) are likewise once again output as the serial signal i2 is then executed.

A delayed clock signal (because the number of parallel signals is three, f2-1 to f2-3 are indicated) is supplied from the delayed clock signal generator 136 to the second buffer circuit group 126 in accordance with the switching timing for switching the input ports Q1 to Q8 of the multiplexer 124. For the delayed clock signal generator 136, the clock frequency is the PON rate and the delay value provides the timing for switching the input ports of the multiplexer 124. The time waveforms (f2-1, f2-2, and f2-3) shown in the ninth, eleventh and thirteenth stages are supplied with a delay for each single interface-rate time slot to the high-speed variable clock signal j2 (the delay amounts are shown by right-facing arrow in the time waveform shown in the ninth, eleventh, and thirteenth stages in FIG. 3). That is, a delay for each single interface-rate time slot is supplied sequentially to the parallel signal components f2-1, f2-2, and f2-3.

Therefore, the reading from the buffer circuits 1, 2, and 3 of the second buffer circuit group 126 is performed with the switching timing for switching the input ports Q1, Q2, and Q3. As shown in the time waveforms shown in the ninth, eleventh, and thirteenth stages (f2-1, f2-2, and f2-3), the data D1 to D3 are read from the buffer circuits 1 to 3 at the lead times of the respective delayed clock signals (f2-1, f2-2, and f2-3) (at the switching times of the switching to the output ports Q1, Q2, and Q3). The next lead time of the delayed clock signal f2-1 is the switching time of the switching to the input port Q1 of the next time slot after the end of one time slot of the PON rate, whereupon the data D4 are read out.

Here, because data are not read from the buffer circuits 4 to 8, clock pulses are not supplied to these buffer circuits. That is, clock pulses are not supplied by the delayed clock signal generator 136 to the buffer circuits 4 to 8.

In order to write data D1, D2, and D3 to the buffer circuits 1, 2, and 3 of the second buffer circuit group 126, the write clock signal d2 which is the clock frequency of the PON rate is supplied by the frequency divider 138 to the buffer circuits 1, 2, and 3. The write clock signal d2 is a clock signal with the time waveform shown in the fourth stage of FIG. 7 and the same signal is supplied simultaneously to the buffer circuits 1, 2 and 3. As a result, the data D1, D2, and D3 which were written in parallel at the same time are written to the buffer circuits 1, 2 and 3. The parallel signals in which data D1, D2, and D3 are constituted in parallel are the parallel signals 121.

In order to change the number of parallel signals in the variable parallel to serial conversion unit 120, the number of clock pulses generated by the high-speed variable clock signal generator 130 is changed. In the example shown in FIG. 7, because a case where the number of parallel signals is three has been assumed, the number of clock signals generated by the high-speed variable clock signal generator 130 is set as a waveform that contains three consecutive clock pulses as per the high-speed variable clock signal j2 shown in the seventeenth stage of FIG. 7.

Electrical Mount Circuit of the Variable Parallel to Serial Conversion Unit

Constitution

Figure 8:
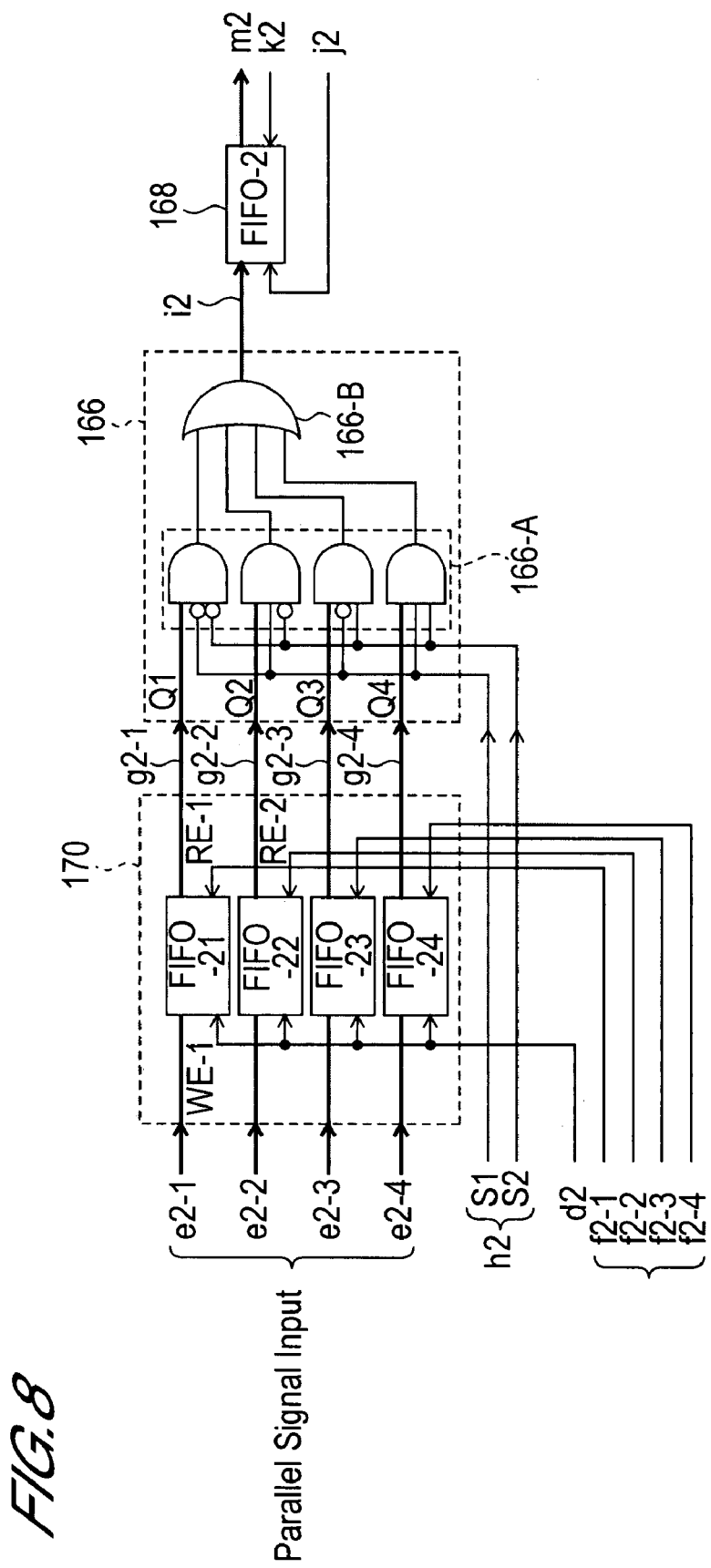
FIG. 8 is a schematic electrical circuit view of the variable parallel to serial conversion unit.

An example of the electrical mount circuit of the variable parallel to serial conversion unit will now be described with reference to FIG. 8. FIG. 8 is a schematic electrical circuit view of the variable parallel to serial conversion unit. In order to simplify the description, the description is made by assuming a case where the maximum number of parallel signals in the variable parallel to serial conversion is four and the number of input ports of a multiplexer 166 that corresponds to the multiplexer 124 shown in FIG. 6 is four.

In the electrical mount circuit of the variable parallel to serial conversion unit shown in FIG. 8, the buffer circuits that constitute the second buffer circuit 122 and second buffer circuit group 126 shown in FIG. 6 are constituted by a FIFO (First In First Out) buffer circuit. In other words, the buffer circuit corresponding to the second buffer circuit 122 corresponds to the second stack memory 168 that uses the FIFO-2 in FIG. 8 and the buffer circuit group constituting the second buffer circuit group 126 corresponds to the second stack memory group 170 in FIG. 8. The buffer circuits constituting the second stack memory group 170 are FIFO-21 to 24.

In FIG. 8, because a FIFO is adopted for the buffer circuits that constitute the second buffer circuit and the second buffer circuit group, when it is necessary to identify the FIFO buffer circuits, same can be -distinguished by assigning FIFO-2, FIFO-21, FIFO-22, FIFO-23, and FIFO-24, and identification numbers. In the following description, FIFO-2 is sometimes also used in place of the second stack memory 168. Further, the buffer circuits FIFO-21, FIFO-22, FIFO-23, and FIFO-24 which constitute the second stack memory group 170 are not judged as being buffer circuits that constitute the second stack memory 170 and are also referred to simply as FIFO-21, FIFO-22, FIFO-23, and FIFO-24.

The write signal input terminal of the FIFO will also be called 'WE' and the read signal input terminal of the FIFO is also referred to as 'RE'. Furthermore, in order to identify the write signal input terminals to the FIFO-21, FIFO-22, and FIFO-23, and so forth, identification numbers are sometimes shown added as 'WE-1', 'WE-2', and 'WE-3', and so forth. Likewise, in order to identify the read signal input terminals from the FIFO-21, FIFO-22, and FIFO-23, identification numbers are shown added as 'RE-1', 'RE-2', and 'RE-3', and so forth.

The multiplexer 166 is constituted by an AND gate group 166-A which identifies the input ports Q1 to Q4, and an OR gate 160-B which integrates the data (D1, D2, and so forth).

Operation

Figure 9:
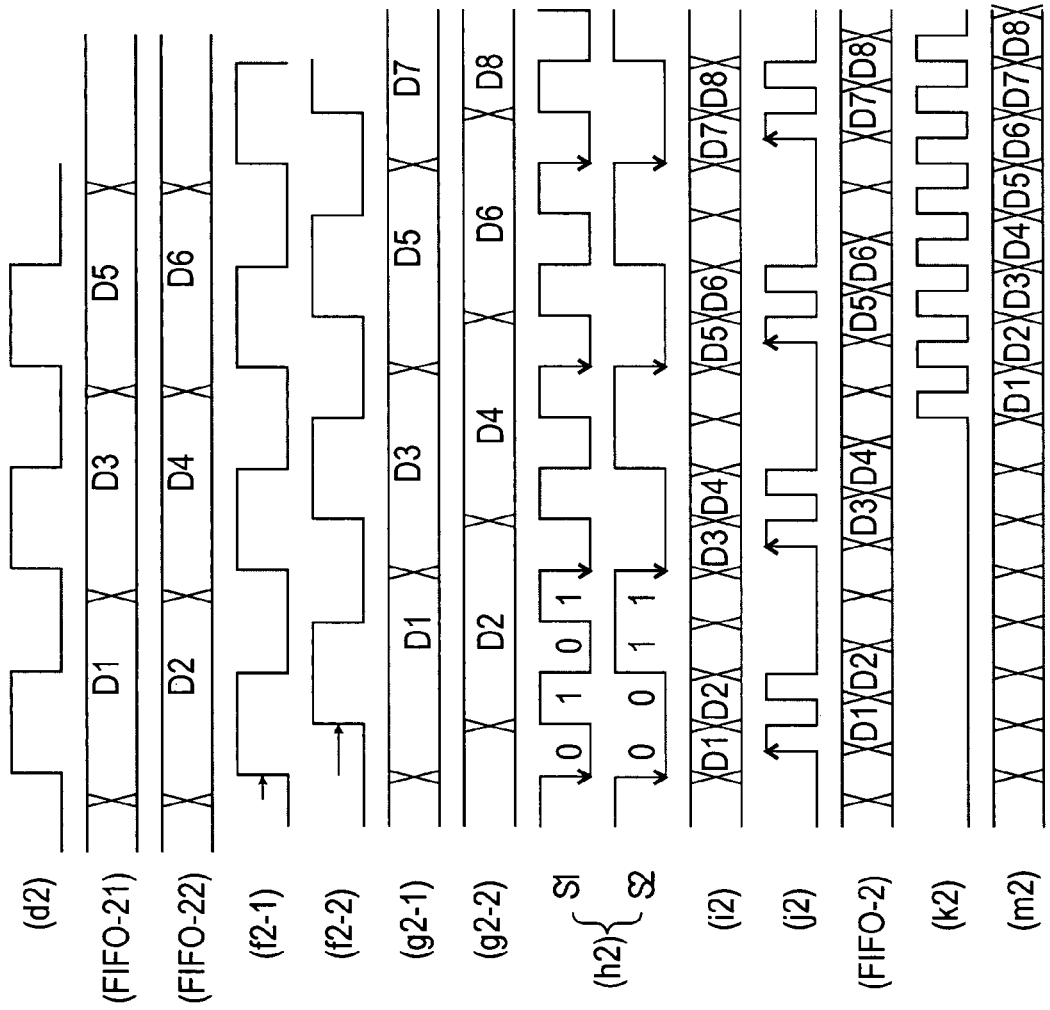
FIG. 9 is a timing chart that is supplied in the description of the operation that focuses on a multiplexer of the variable parallel to serial conversion unit.

The operation of the electrical mount circuit of a variable parallel to serial conversion unit will be described with reference to FIG. 9. FIG. 9 is a timing chart that is provided in the description of an operation that is centered on the multiplexer of the variable parallel to serial conversion unit. For the sake of expediency, although an operation description is provided here by assuming a case where the number of parallel signals processed is two, the following description is valid and not limited to such conditions.

A timing chart that shows the uppermost first stage to the lowermost fourteenth stage in FIG. 9 is as follows.

The time waveform (d2) shown in the first stage is a time waveform for the low-speed clock signal d2 that is supplied by the frequency divider 138 shown in FIG. 6. Parallel signal components (e2-1 and e2-2) are input to the first stack memory group 170 in sync with the low-speed clock signal d2 as a result of the low-speed clock signal d2 being input to the respective WE clock signal input terminals of the FIFO-21 to FIFO-24 as WE clock signals of the FIFO-21 to FIFO-24. The time waveforms shown in the second and third stages are time waveforms of the respective parallel signal components (e2-1 and e2-2).

Data (D1, D2) are input as parallel signal components (e2-1 and e2-2) in parallel to the FIFO-21 and FIFO-22 in sync with the low-speed clock signal d2 and, in the next cycle of the low-speed clock signal d2, data (D3, D4) are input and, in the next cycle again of the low-speed clock signal d2, data (D5, D6) are input.

The time waveforms (f2-1) and (f2-2) shown in the fourth and fifth stages are time waveforms for the delayed clock signals f2-1 and f2-2 which are each generated and output by the control signal generation section 178. The delayed clock signals (f2-1) and (f2-2) are input to the RE clock signal input terminals of the RE-1 of FIFO-21 and the RE-2 of FIFO-22.

The time waveforms (g2-1) and (g2-2) shown in the sixth and seventh stages are time waveforms of the parallel signal components (g2-1) and (g2-2) that are input to the input ports Q1 and Q2 of the multiplexer 166. The parallel signal component (g2-2) which is output by the FIFO-22 is output delayed by one clock pulse of the high-speed clock signal by means of the parallel signal component (g2-1) that is output by the FIFO-21.

The time waveform (h2) shown in the eighth and ninth stages is a select signal h2 for controlling the multiplexer 166 which is output by the control signal generation section 178 and comprises a set of a select signal S1 and a select signal S2. The select signal h2 is a signal for switching the input ports Q1, Q2, Q3, and Q4 of the multiplexer 166. The select signals S1 and S2 are rectangular waves comprising a rectangular clock pulse. Further, the select signal S2 is a rectangular wave with a frequency that is ½ that of the select signal S1 and the frequency of the select signal S1 is a frequency with a frequency that is ½ that of the high-speed clock signal k2. The select signal h2 is input to the AND gate group 166-A as shown in FIG. 8.

The combinations of values of the select signals S1 and S2 are (S1, S2)=(0, 0), (1, 0), (0, 1), and (1, 1). When (S1, S2)=(0, 0), (1, 0), (0, 1), and (1, 1), a state where data signals are input to the input ports Q1, Q2, Q3, and Q4 of the multiplexer 166.

The time waveform (i2) shown in the tenth stage is a time waveform of the multiplexed output data signal i2 that is output by the multiplexer 166. The data signals (D1, D2), (D3, D4) and so forth that are input to the OR gate 166-B in sync with the select signal h2 are output in parallel on the time axis as a multiplexed output data signal i2 from the output terminal of the OR gate 166-B.

The time waveform (j2) shown in the eleventh stage is a time waveform of the high-speed variable clock signal j2 which is supplied by the high-speed variable clock signal generator 130 shown in FIG. 6 to the FIFO-2. That is, the high-speed variable clock signal j2 is the WE clock signal of the FIFO-2. The high-speed variable clock signal j2 (WE signal) has a set of consecutive rectangular clock pulses of two bits each arranged in a row on the time axis at fixed intervals. As a result of the set of rectangular clock pulses of two bits each, the sets of data input (written) to the FIFO-2 are a set of data (D1, D2), a set of data (D3, D4), a set of data (D5, D6), and a set of data (D7, D8). The time waveform (FIFO-2) shown in the twelfth stage is a time waveform for a data signal which is written to FIFO-2. The data signals (D1, D2) and (D3, D4) and so forth are arranged in a row on the time axis.

The time waveform (k2) shown in the thirteenth stage is a time waveform of the high-speed clock signal k2 that is supplied by the PHY/MAC interface 150 shown in FIG. 6 to the FIFO-1. That is, the high-speed clock signal k2 is an RE clock signal of the FIFO-2. A multiplexed output data signal m2 is output from the FIFO-2 as a result of the high-speed clock signal k2 (RE signal). The time waveform (m2) shown in the fourteenth stage is a time waveform of the data signals D1 to D8 which is read from the FIFO-2.

That is, the serial signal m2 that is input to the PHY/MAC interface 150 is converted from parallel signals for which the number of parallel signals is two. Here, because the parallel signals are parallel signals for which the number of parallel signals is two, actual data are temporarily stored in the FIFO-21 and FIFO-22 and actual data are not temporarily stored in the FIFO-23 and FIFO-24.

Bandwidth Management Section

The bandwidth management section 100 is constituted comprising a command line interface 102, a timer 104, and a memory 106, as shown in FIG. 2 and has a function to supply a bandwidth setting signal c1 to the variable serial to parallel conversion unit 80. Further, the bandwidth management section 140 is constituted comprising a command line interface 142, a timer 144, and a memory 146, as shown in FIG. 6 and has a function to supply the bandwidth setting signal c2 to the variable parallel to serial conversion unit 120.

The constitution of the bandwidth management section 100 and bandwidth management section 140 is the same and the command line interface, timer, and memory which are the constituent elements thereof are the same. Hence, the bandwidth management section 100 will be described by way of example here.

The command line interface 102 is an interface for performing control and management so that the number of parallel signals in the serial to parallel conversion can be supplied by an external device such as an external console to the variable serial to parallel conversion unit 80. That is, the number of parallel signals indicated by the external device is identified and then reported to the variable serial to parallel conversion unit 80. The bandwidth setting signal c1 is supplied to the variable serial to parallel conversion unit 80, supplied to the timer 104, and also supplied to the memory 106 for storage therein. The information on the number of parallel signals that is stored in the memory 106 is read as a result of a request from the external device via the command line interface 102. Further, the time that the bandwidth setting signal c1 is sustained is measured by the timer 104.

The information on the number of parallel signals stored in the memory 106 and the information relating to the time that the bandwidth setting signal c1 is sustained which has been measured by the timer 104 can be read and utilized as a result of a request from the external device via the command line interface 102. Bandwidth management is made possible based on information relating to the number of parallel signals and the time that the bandwidth setting signal c1 is sustained which is stored in the memory 106, for example. Furthermore, by storing the bandwidth management information, it is possible to perform billing processing for the user that utilizes the optical line terminal by adopting a rational basis that is based on the bandwidth management information, for example.

Control Signal Generation Circuit

Constitution

Figure 10:
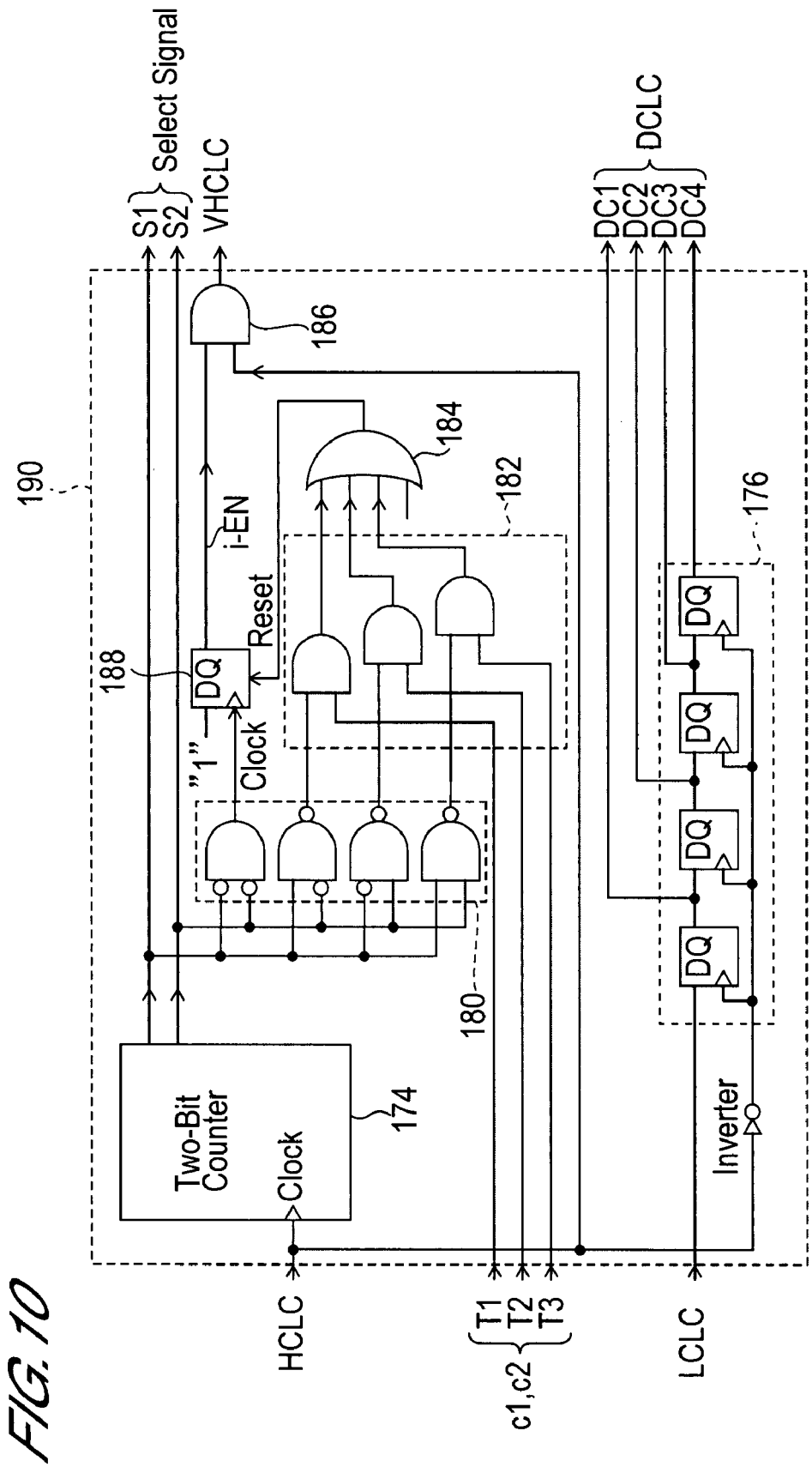
FIG. 10 is a schematic electrical circuit view of the control signal generation circuit.

An example of the electrical mount circuit of the control signal generation circuit will now be described with reference to FIG. 10. More specifically, the control signal generation circuit is utilized in order to constitute the control signal generation section 172 that the variable serial to parallel conversion unit 80 comprises and the control signal generation section 178 that the variable parallel to serial conversion unit 120 comprises. FIG. 10 is a schematic electrical circuit view of the control signal generation circuit. In order to simplify the description, the description is made by assuming a case where it is possible to accommodate up to a maximum of four parallel signals in the variable serial to parallel conversion or the variable parallel to serial conversion.

The control signal generation circuit 190 shown in FIG. 10 comprises a two-bit counter 174, a shift register 176, a NAND gate group 180, an AND gate group 182, an OR gate 184, an AND gate 186, and a flip-flop circuit 188. The shift register 176 is a shift register of four bits comprising four stages.

The relationships between a high-speed clock signal HCLC, stage number switching signals T1 to T3, a low-speed clock signal LCLC, select signals S1 and S2, a high-speed variable clock signal VHCLC and a delayed clock signal DCLC with various signals that are established in the description of the operation of the serial to parallel conversion unit or the parallel to serial conversion unit described with reference to FIGS. 2 and 6 are as follows.

The high-speed clock signal HCLC is a signal that is output by the high-speed clock signal generator 92 or 132. The stage number switching signals T1 to T3 are the bandwidth setting signal c1 or c2 which are output by the bandwidth management section 100 or 140. In FIGS. 2 and 6, one signal line is shown for the bandwidth setting signal c1 or c2 from the bandwidth management section 100 or 140. However, a plurality of signal lines may be formed in a mount circuit.

The low-speed clock signal LCLC is a signal that is output by the frequency divider 98 or 138. Select signals S1 and S2 correspond to the switch changeover signal h1 for the demultiplexer 84 that is output by the demultiplexer control signal generator 94 or to the switch changeover signal h2 for the multiplexer 124 that is output by the multiplexer control signal generator 134.

The high-speed variable clock signal VHCLC corresponds to the read signal f1 that is output by the high-speed variable clock signal generator (HS-VCSG) 90 or the read signal j2 that is output by the high-speed variable clock signal generator 130.

The delayed clock signal DCLC (DC1 to DC4) corresponds to the delayed clock signals i1-1, i1-2, and i1-3 that are output by the delayed clock signal generator 96 or to the delayed clock signals f2-1, f2-2, and f2-3 and so forth that are output by the delayed clock signal generator 136.

Operation

Figure 11:
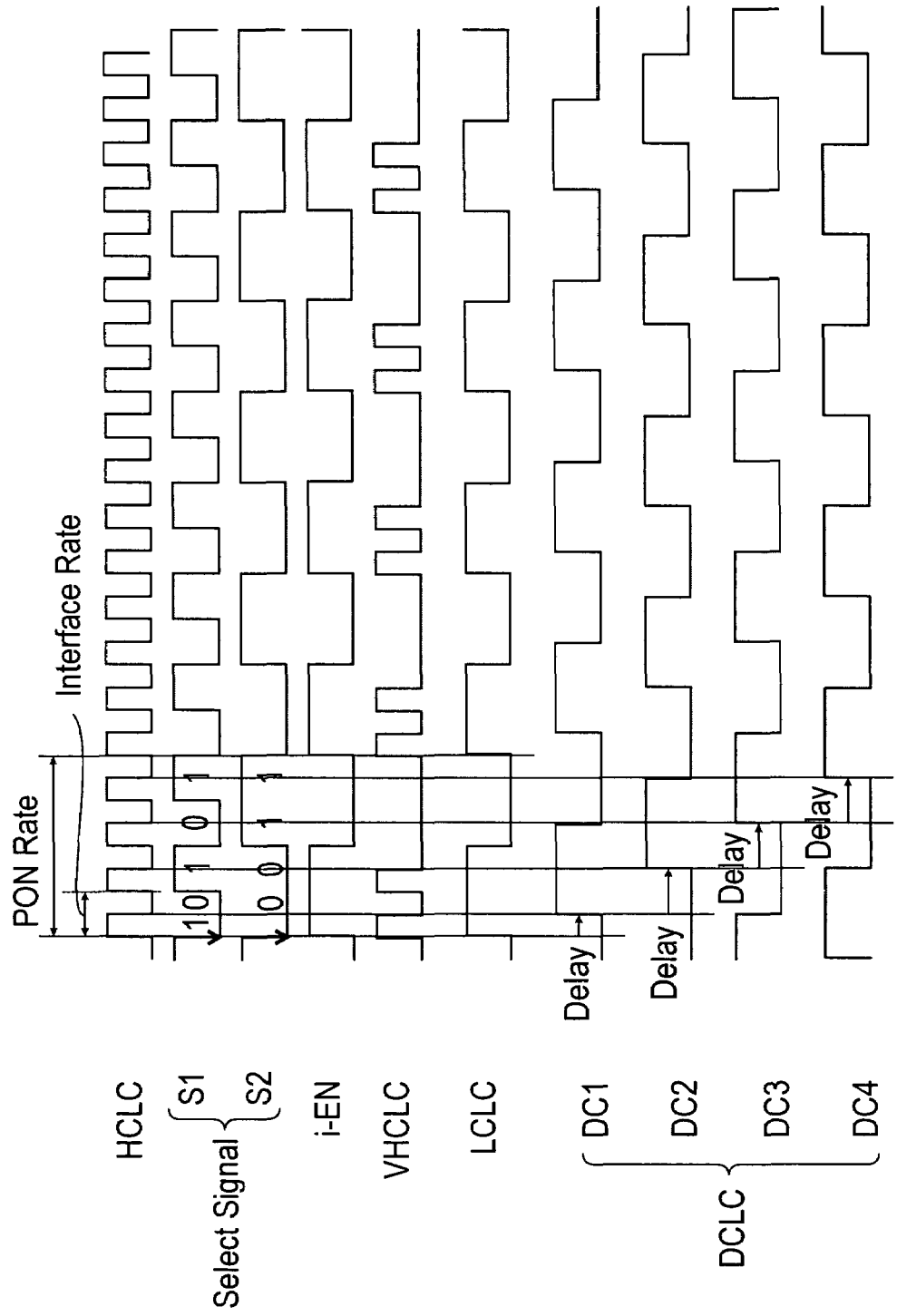
FIG. 11 is a timing chart that is supplied in the description of the operation of the control signal generation circuit.

The operation of the electrical mount circuit of the control signal generation circuit will now be described with reference to FIG. 11. FIG. 11 is a timing chart that is provided in the description of the operation of the control signal generation circuit. The timing charts shown from the uppermost first stage to the lowermost eleventh stage in FIG. 11 are as follows:

The time waveform (HCLC) shown in the first stage is a time waveform of a high-speed clock signal that is input to the clock signal input terminal of the two-bit counter 174. As a result of the high-speed clock signal HCLC being input to the two-bit counter 174, the select signals S1 and S2 are generated and output.

The time waveforms (S1, S2) shown in the second and third stages are time waveforms for the select signals S1 and S2. The output signals (S1, S2)=(0, 0), (1, 0), (0, 1), and (1, 1) are cyclically repeated and output from the two-bit counter 174.

The time waveform (i-EN) shown in the fourth stage is a time waveform for the internal enable signal i-EN that is output by the flip-flop circuit 188.

The time waveform (VHCLC) shown in the fifth stage is a time waveform for the high-speed variable clock signal VHCLC that is output by the AND gate 186.

The time waveform (LCLC) shown in the sixth stage is a time waveform for the low-speed clock signal LCLC that is input to the shift register 176.

The time waveforms (DCLC:DC1 to DC4) shown in the seventh to tenth stages are time waveforms for the low-speed clock signals DC1 to DC4 that are output by the first to fourth stages of the shift register 176 respectively.

When (S1, S2)=(0,0) is output by the two-bit counter 174, '1' is held in the flip-flop circuit 188 and, by resetting the flip-flop circuit 188 when the number of parallel signals indicated by the stage number switching signals T1 to T3 has been reached, the internal enable signal i-EN is generated and output by the flip-flop circuit 188. By inputting the internal enable signal i-EN and the high-speed clock signal HCLC to the AND gate 186, the high-speed variable clock signal VHCLC is generated and output by the AND gate 186.

A signal that reflects the low-speed clock signal LCLC and the high-speed clock signal HCLC is input to the four-bit shift register 176. Thus, delayed clock signals DC1 to DC4 are output from the first to fourth stages of the shift register 176. The delayed clock signals DC1 to DC4 that are output from the respective first to fourth stages of the shift register 176 each have a delay equivalent to one cycle of the high-speed clock signal HCLC added thereto in sequence and are output by the shift register 176.

When a control signal generation circuit is utilized to constitute the control signal generation section 172 that the variable serial to parallel conversion unit control section 80 comprises and the control signal generation section 178 that the variable parallel to serial conversion unit control section 120 comprises, the relationships between the constituent elements of the control signal generation circuit and the respective constituent elements of the control signal generation section 172 that the variable serial to parallel conversion unit control section 80 comprises and the control signal generation section 178 that the variable parallel to serial conversion unit control section 120 comprises are as follows.

The demultiplexer control signal generator 94, delayed clock signal generator 96, and high-speed variable clock signal generator 90 that constitute the control signal generation section 172 shown in FIG. 2 correspond to the two-bit counter 174, shift register 176, and to the other parts excluding the two-bit counter 174 and shift register 176 that constitute the control signal generation circuit 190 shown in FIG. 10. The 'other parts excluding the two-bit counter 174 and shift register 176 that constitute the control signal generation circuit 190' refers to the NAND gate group 180, AND gate group 182, OR gate 184, AND gate 186, and flip-flop circuit 188.

Furthermore, the multiplexer control signal generator 134, delayed clock signal generator 136, and high-speed variable clock signal generator 130 that constitute the control signal generation section 178 shown in FIG. 6 correspond to the two-bit counter 174, shift register 176, and to the other parts excluding the two-bit counter 174 and shift register 176 that constitute the control signal generation circuit 190 shown in FIG. 10. The 'other parts excluding the two-bit counter 174 and shift register 176 that constitute the control signal generation circuit 190' refers to the NAND gate group 180, AND gate group 182, OR gate 184, AND gate 186, and flip-flop circuit 188.

What is claimed is:

1. An optical access network system in which a star coupler is provided at one end of an optical fiber channel and which performs two-way optical communications using code division multiplexing between an optical line terminal that is joined to the other end of said optical fiber channel and a plurality of optical network units respectively joined to a plurality of branched optical fiber channels that are formed branched by said star coupler, wherein said optical line terminal comprises a bandwidth allocation section and a bandwidth control section comprising signal converter pairs in a number equal to the number of said optical network units, each of said optical network units comprises a bandwidth allocation section and a bandwidth control section that comprises one set of signal converter pairs, each of said signal converter pairs is installed as one set of a variable serial to parallel conversion unit and a variable parallel to serial conversion unit each having a variable bandwidth management function, and said bandwidth allocation section comprises an encoder group that comprises a plurality of encoders that encode parallel signals that are output by said variable serial to parallel conversion unit and a parallel signal multiplexer that multiplexes said parallel signals that are output by said encoder group, a decoder group that comprises a plurality of decoders that decode parallel signals that are input to said variable parallel to serial conversion unit, and a serial signal distributor that divides the serial signal for generating the parallel signals that are input to said decoder group.

2. The code division multiplexing optical access network system according to claim 1, wherein said optical line terminal further comprises:

PHY/MAC interfaces provided in a number equal to the number of said optical network units and having a function to perform 4B5B conversion on a serial signal that is input to a layer-3 switch and a serial signal that is output by said layer-3 switch; and an O/E converter that converts a signal that is input to said bandwidth allocation section into an electrical signal and converts an electrical signal that is output by the bandwidth allocation section into an optical signal, and wherein each of said optical network units further comprises:

a PHY/MAC interface that has a function to perform 4B5B conversion on a serial signal; and an O/E converter that converts a signal that is input to said bandwidth allocation section into an electrical signal and converts a signal that is output by said bandwidth allocation section into an optical signal.

3. The code division multiplexing optical access network system according to claim 1, wherein said variable serial to parallel conversion unit comprises: a demultiplexer that converts a serial signal into parallel signals; a first buffer circuit that temporarily stores the serial signal and inputs the serial signal to said demultiplexer; a first buffer circuit group that temporarily stores the parallel signals that are output by said demultiplexer and inputs the parallel signals to said bandwidth allocation section; and a variable serial to parallel conversion unit control section, said variable parallel to serial conversion unit comprises: a multiplexer that converts parallel signals into a serial signal; a second buffer circuit group that temporarily stores the parallel signals output by said decoder group of said bandwidth allocation section and inputs the parallel signals to said multiplexer; a second buffer circuit that temporarily stores and outputs the serial signal output by said multiplexer; and a variable parallel to serial conversion unit control section, said variable serial to parallel conversion unit control section comprises a demultiplexer control signal generator, a first high-speed variable clock signal generator, and a first delayed clock signal generator and supplies a control signal to said demultiplexer, said first buffer circuit and said first buffer circuit group, and said variable parallel to serial conversion unit control section comprises a multiplexer control signal generator, a second high-speed variable clock signal generator, and a second delayed clock signal generator, and supplies a control signal to said multiplexer, said second buffer circuit, and said second buffer circuit group.

4. The code division multiplexing optical access network system according to claim 2, wherein said variable serial to parallel conversion unit comprises: a demultiplexer that converts a serial signal into parallel signals; a first buffer circuit that temporarily stores the serial signal and inputs the serial signal to said demultiplexer; a first buffer circuit group that temporarily stores the parallel signals that are output by said demultiplexer and inputs the parallel signals to said bandwidth allocation section; and a variable serial to parallel conversion unit control section, said variable parallel to serial conversion unit comprises: a multiplexer that converts parallel signals into a serial signal; a second buffer circuit group that temporarily stores the parallel signals output by said decoder group of said bandwidth allocation section and inputs the parallel signals to said multiplexer; a second buffer circuit that temporarily stores and outputs the serial signal output by said multiplexer; and a variable parallel to serial conversion unit control section, said variable serial to parallel conversion unit control section comprises a demultiplexer control signal generator, a first high-speed variable clock signal generator, and a first delayed clock signal generator and supplies a control signal to said demultiplexer, said first buffer circuit and said first buffer circuit group, and said variable parallel to serial conversion unit control section comprises a multiplexer control signal generator, a second high-speed variable clock signal generator, and a second delayed clock signal generator, and supplies a control signal to said multiplexer, said second buffer circuit, and said second buffer circuit group.

5. The code division multiplexing optical access network system according to claim 1, further comprising:

a bandwidth management section that sends a bandwidth setting signal for changing the number of parallel signals to the variable serial to parallel conversion unit control section; and a bandwidth management section that sends a bandwidth setting signal for changing the number of parallel signals to said variable parallel to serial conversion unit control section, wherein each of said bandwidth management sections is constituted comprising a command line interface, a timer, and a memory.

6. The code division multiplexing optical access network system according to claim 2, further comprising:

a bandwidth management section that sends a bandwidth setting signal for changing the number of parallel signals to the variable serial to parallel conversion unit control section; and a bandwidth management section that sends a bandwidth setting signal for changing the number of parallel signals to said variable parallel to serial conversion unit control section, wherein each of said bandwidth management sections is constituted comprising a command line interface, a timer, and a memory.

7. The code division multiplexing optical access network system according to claim 3, further comprising:

a bandwidth management section that sends a bandwidth setting signal for changing the number of parallel signals to the variable serial to parallel conversion unit control section; and a bandwidth management section that sends a bandwidth setting signal for changing the number of parallel signals to said variable parallel to serial conversion unit control section, wherein each of said bandwidth management sections is constituted comprising a command line interface, a timer, and a memory.

8. The code division multiplexing optical access network system according to claim 4, further comprising:

a bandwidth management section that sends a bandwidth setting signal for changing the number of parallel signals to the variable serial to parallel conversion unit control section; and a bandwidth management section that sends a bandwidth setting signal for changing the number of parallel signals to said variable parallel to serial conversion unit control section, wherein each of said bandwidth management sections is constituted comprising a command line interface, a timer, and a memory.

9. The code division multiplexing optical access network system according to claim 3, wherein a control signal generation section of said variable serial to parallel conversion unit control section which generates and outputs a switch changeover signal that is supplied to said demultiplexer, a read signal that is supplied to said first buffer circuit and a delayed clock signal that is supplied to said first buffer circuit group, and a control signal generation section of said variable parallel to serial conversion unit control section which generates and outputs a switch changeover signal that is supplied to said multiplexer, a read signal that is supplied to said second buffer circuit and a delayed clock signal that is supplied to said second buffer circuit group, are each formed by a control signal generation circuit that is constituted comprising a two-bit counter, a shift register, a NAND gate group, an AND gate group, an OR gate, an AND gate, and a flip-flop circuit.

10. The code division multiplexing optical access network system according to claim 4, wherein a control signal generation section of said variable serial to parallel conversion unit control section which generates and outputs a switch changeover signal that is supplied to said demultiplexer, a read signal that is supplied to said first buffer circuit and a delayed clock signal that is supplied to said first buffer circuit group, and a control signal generation section of said variable parallel to serial conversion unit control section which generates and outputs a switch changeover signal that is supplied to said multiplexer, a read signal that is supplied to said second buffer circuit and a delayed clock signal that is supplied to said second buffer circuit group, are each formed by a control signal generation circuit that is constituted comprising a two-bit counter, a shift register, a NAND gate group, an AND gate group, an OR gate, an AND gate, and a flip-flop circuit.

* * * * *